US012793886B2

(12) United States Patent
Tonogai et al.

(10) Patent No.: US 12,793,886 B2
(45) Date of Patent: Nov. 10, 2026

(54) COIL DEVICE

(71) Applicant: TDK CORPORATION, Tokyo (JP)

(72) Inventors: Toru Tonogai, Tokyo (JP); Arisa Furuya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 805 days.

(21) Appl. No.: 18/130,509

(22) Filed: Apr. 4, 2023

(65) Prior Publication Data

US 2023/0326668 A1 Oct. 12, 2023

(30) Foreign Application Priority Data

Apr. 8, 2022 (JP) ................................ 2022-064623

(51) Int. Cl.

| | |
|---|---|
| ***H01F 27/28*** | (2006.01) |
| ***H01F 27/24*** | (2006.01) |
| ***H01F 27/29*** | (2006.01) |
| ***H01F 27/30*** | (2006.01) |
| ***H01F 27/32*** | (2006.01) |

(52) U.S. Cl.

CPC ........... *H01F 27/306* (2013.01); *H01F 27/24* (2013.01); *H01F 27/2852* (2013.01); *H01F 27/292* (2013.01); *H01F 27/32* (2013.01)

(58) Field of Classification Search

CPC ........ H01F 27/29; H01F 27/292; H01F 17/04; H01F 27/24; H01F 2017/048; H01F 27/2828; H01F 27/2852; H01F 2017/046

USPC .................................................... 336/83, 192

See application file for complete search history.

(56) References Cited

U.S. PATENT DOCUMENTS

| | | | | |
|---|---|---|---|---|
| 2015/0130580 A1* | 5/2015 | Lee | H01F 27/29 | 336/200 |
| 2015/0318105 A1* | 11/2015 | Lee | H01F 27/292 | 336/192 |
| 2016/0075058 A1* | 3/2016 | Takahashi | B22F 1/10 | |
| 2016/0126006 A1* | 5/2016 | Ahn | H01F 27/306 | 29/606 |
| 2018/0286569 A1 | 10/2018 | Ahn et al. | | |
| 2019/0027287 A1* | 1/2019 | Kudo | H01F 27/29 | |
| 2019/0198226 A1* | 6/2019 | Kawamura | H01F 27/29 | |
| 2019/0326041 A1* | 10/2019 | Kawaguchi | H01F 1/06 | |
| 2020/0265993 A1 | 8/2020 | Kitashima | | |
| 2021/0098181 A1* | 4/2021 | Araki | H01F 17/04 | |

(Continued)

FOREIGN PATENT DOCUMENTS

| | | |
|---|---|---|
| JP | 2001155932 A * | 6/2001 |
| JP | 2005-294461 A | 10/2005 |
| JP | 2010177492 A * | 6/2010 |

(Continued)

OTHER PUBLICATIONS

Jun. 23, 2026 Office Action issued in Japanese Patent Application No. 2022-064623.

*Primary Examiner* — Tszfung J Chan
(74) *Attorney, Agent, or Firm* — Oliff PLC

(57) ABSTRACT

A coil device 2 including a core 4, a coil 6 having a winding 60 embedded inside the core 4, and a lead-out **6*b* led out from the winding 60 to a bottom 4*a* of the core 4. The lead-out 6*b* includes a terminal 61 arranged at the bottom 4*a* of the core 4, the terminal 61 includes an embedded part 610 embedded inside the core 4 and an exposed part 611 exposed from the core 4. A metal layer 8 is formed on a surface of the exposed part 611**.

14 Claims, 19 Drawing Sheets

(56) References Cited

U.S. PATENT DOCUMENTS

2021/0375529 A1* 12/2021 Yang .................... H01F 27/292

FOREIGN PATENT DOCUMENTS

| | | | | | |
|---|---|---|---|---|---|
| JP | 2015220272 A | * | 12/2015 | | |
| JP | 2016092422 A | | 5/2016 | | |
| JP | 2017-510072 A | | 4/2017 | | |
| JP | 2019-153642 A | | 9/2019 | | |
| JP | 2020136508 A | | 8/2020 | | |
| WO | 2015/150274 A1 | | 10/2015 | | |
| WO | WO-2020179298 A1 | * | 9/2020 | ............ | H01F 27/29 |

* cited by examiner

COIL DEVICE

TECHNICAL FIELD

The invention relates to a coil device.

BACKGROUND

As an example of a coil device used such as an inductor, the coil device described in Patent Document 1 is known. The coil device described in Patent Document 1 has a core and a coil embedded inside the core, and a lead-out of the coil is arranged at the bottom of the core. The lead-out is plated so that the lead-out arranged at the bottom of the core can be connected to the mounting substrate. In this way, by allowing the lead-out of the coil to function as a connection with the mounting substrate, it becomes possible to omit the step of forming a terminal electrode, such as a resin electrode electrically connected to the lead-out, on the surface of the core. Thus, the production of the coil device can be facilitated and the production cost can be reduced.

However, according to the coil device described in Patent Document 1, since there is a gap between the lead-out of the coil and the bottom of the core, a plating solution may enter the gap and leave residue of the plating solution. Moreover, when mounting the coil device on the mounting substrate, there is a possibility that flux may enter the gap and corrode the lead-out. An improvement is desired since such situations lead to deterioration in the quality and reliability of the coil device.

[Patent Document 1] Japanese Unexamined Patent Application Publication 2017-510072

SUMMARY

The invention has been made considering the above circumstances, and its object is to provide a coil device having a high quality and a high reliability.

In order to achieve the above object, the coil device according to the invention is a coil device having a core, a coil having a winding embedded inside the core, and a lead-out led from the winding to a bottom of the core, in which the lead-out has a terminal arranged at the bottom of the core, the terminal has an embedded part embedded inside the core and an exposed part exposed from the core, and a metal layer is formed on a surface of the exposed part.

In the coil device according to the invention, a metal layer is formed on the surface of the exposed part. Therefore, it is possible to mount the coil device on the substrate via the metal layer. Thus, it is not necessary to form a terminal electrode on the surface of the core separately from the metal layer, and it is possible to facilitate the manufacture of the coil device and reduce the manufacturing cost.

In addition, the terminal has an embedded part embedded inside the core and an exposed part exposed from the core. Since the terminal is exposed from the core as an exposed part, the exposed part can contribute to the connection with the substrate. In addition, since the terminal is embedded inside the core as an embedded part, there is no gap, a space in which plating solution, flux, etc. may enter, between the terminal and the bottom of the core. Therefore, it is possible to prevent a generation of plating liquid residues or a corrosion of the lead-out due to flux, and is possible to improve the quality and reliability of the coil device.

In addition, by fixing the embedded part to the core inside the core, the fixing strength between the terminal and the core can be increased, and the terminal can be prevented from peeling off from the bottom of the core.

The metal layer is preferably comprised by a metal film. With such a composition, it is possible to improve the solder wettability of the metal layer, dramatically improve the connection strength between the metal layer and the substrate, and effectively prevent a defective mounting of the coil device.

The exposed part may have a first end, an end of the lead-out, and a second end, located on the opposite side of the first end along an extending direction of the exposed part, and a curved surface that curves toward the bottom of the core may be formed on the surface of the exposed part at the second end. With such a configuration, for example, the solder can be formed thickly on the curved surface when connecting the metal layer to the substrate with solder, and the connection strength between the metal layer and the substrate can be increased.

The metal layer may not exist at a position spaced apart from a bottom surface of the metal layer toward the bottom of the core on the curved surface. With such a configuration, it becomes possible to adjust an area of the metal layer part, an effective metal layer, that substantially contributes to the connection with the substrate according to an area of the metal layer non-formation part where the metal layer does not exist. As a result, the area of the effective metal layer can be adjusted according to an area of a land pattern of the substrate.

Preferably, a thickness of the embedded part maybe one forth or more and less the thickness of the terminal. With such a configuration, it is possible to prevent the terminal from peeling off from the bottom of the core. In addition, the height of the coil device can be reduced since a thickness of the exposed part, a part of the terminal exposed from the core, becomes relatively small.

The core may have a resin and a magnetic material, a resin-rich part having a relatively high resin content and a magnetic material-rich part having a relatively high magnetic material content maybe formed at the bottom of the core, and the exposed part maybe exposed from the magnetic material-rich part. The magnetic material-rich part is formed, for example, by irradiating a predetermined range (the exposed part and its surrounding parts) of the bottom of the core with a laser to blow off the resin component. By irradiating the range with a laser and forming the magnetic material-rich part at the bottom of the core, the exposed part can be irradiated with a laser, and the insulation coat on the surface of the exposed part can be removed as a result. This is when the coil is formed by an insulation coated wire. Thereby, it becomes possible to easily form a metal layer on the surface of the exposed part, which can contribute to facilitate the coil device production.

A surface roughness of the bottom of the core in the magnetic material-rich part maybe larger than the surface roughness of the bottom of the core in the resin-rich part. In order to obtain such a configuration, for example, a predetermined range of the bottom of the core is irradiated with a laser at a predetermined intensity, thereby makes it possible to effectively obtain the above-described effects.

The coil is preferably formed by winding an insulation coated flat wire. The flat wire has a relatively wide face. Therefore, with the configuration as described above, the surface area of the exposed part and the metal layer formed on the surface thereof can be increased, and the connection strength between the metal layer and the substrate can be improved.

Preferably, the terminal extends linearly along the bottom of the core from one end to the other end in its extending direction. With such a configuration, it is possible to prevent the terminal from cutting into the core, secure the volume of the core, and thereby improve the magnetic properties of the coil device. Also, it is possible to prevent deterioration in the quality of the coil device due to bending of the terminal.

Preferably, the extending direction of the terminal is inclined with respect to a first direction, in which sides of the core face each other, or a second direction perpendicular to the first direction in a plane parallel to the bottom of the core. With such a configuration, it is possible to increase a length (a surface area) of the embedded part according to an inclination angle of the terminal, thereby increase a bonding strength between the embedded part and the core. Moreover, the length (the surface area) of the exposed part can be increased according to the inclination angle of the terminal, and the connection strength between the exposed part and the substrate can be improved.

With respect to a direction in which one side of the core and the other side of the core face each other, a first distance between the exposed part and the one side of the core and a second distance between the exposed part and the other side of the core are different. For example, if the second distance is greater than the first distance, a relatively large space is formed between the terminal and the other side of the core. As a result, it is possible to increase the thickness of the core and prevent cracks from occurring in the core.

The lead-out may have a connection embedded inside the core and connects the winding and the terminal, the connection maybe bent from the winding to the terminal, a distance between the terminal and the winding with respect to a winding axial direction of the coil maybe smaller than an inner diameter of a bent part of the connection. With such a configuration, it becomes possible to relatively increase a curvature radius of a curved shape (an R-shape) provided at the connection, and thus, a mechanical load added to the connection can be reduced.

A tip of the embedded part may have a convex shape. With such a configuration, inside the core, the tip of the embedded part can be easily engaged with the core and the fixing strength between the core and the embedded part can be increased.

A tip of the embedded part may have a tapered surface, and inside the core, the tapered surface maybe inclined in a direction away from the bottom of the core.

DETAILED DESCRIPTION

Figure 1:
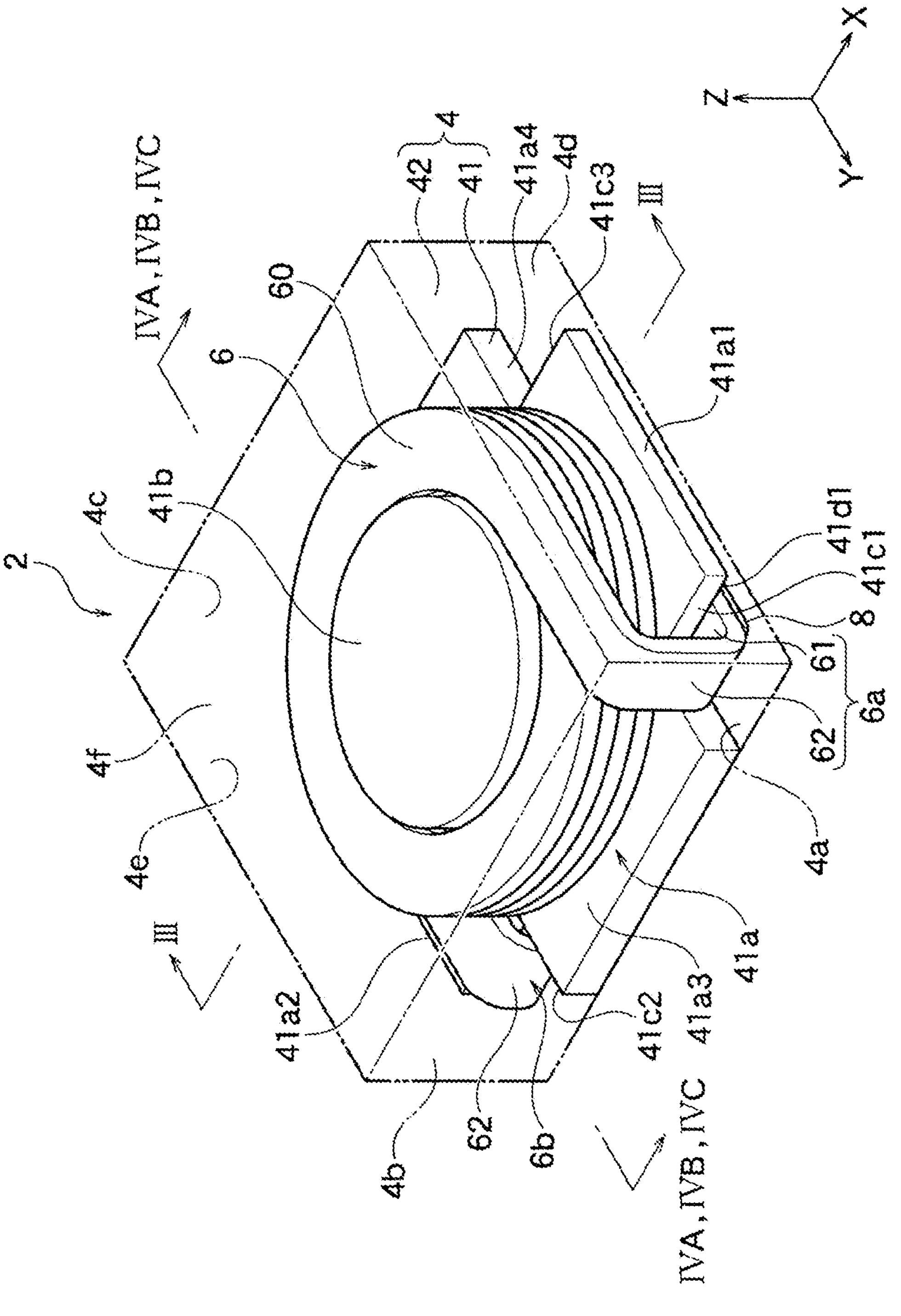
FIG. 1 is a perspective view of the coil device according to a first embodiment of the present invention.

Hereinafter, the invention will be described based on the embodiments shown in the drawings.

First Embodiment

As shown in FIG. 1, the coil device 2 according to the first embodiment of the invention functions such as an inductor, and is mounted on various electronic devices. The coil device 2 has a core 4, a coil 6 and a metal layer 8.

The coil 6 is an air-core coil, and is formed by edgewise winding an insulation coated flat wire. As the insulation coat, such as an epoxy-modified acrylic resin is used. As the materials of the flat wire, copper, silver, alloys thereof, other metals or alloys thereof are used. The coil 6 has a winding 60 and a pair of lead-outs 6*a* and 6*b*. The winding 60 is embedded inside the core 4. The number of turns of the winding 60 is five turns, but is not particularly limited, and may be one turn or more.

The lead-out 6*a* constitutes one end of the coil 6, and the lead-out 6*b* constitutes the other end of the coil 6. The lead-out 6*a* is led out from the uppermost turn (hereinafter referred to as the upper end of the winding 60) of the winding 60 in the winding axial direction toward the bottom 4*a* of the core 4. The lead-out 6*b* is led out from the lowermost turn (hereinafter referred to as the lower end of the winding 60) of the winding 60 in the winding axial direction toward the bottom 4*a* of the core 4. A detailed configuration of the lead-outs 6*a* and 6*b* will be described later.

The core 4 has a substantially rectangular parallelepiped shape and is formed by combining a first layer 41 and a second layer 42. FIGS. 1, 3, and 4A to 4C clearly show the first layer 41 and the second layer 42 as separate members for an explanatory convenience, however, they are substantially integrated and boundaries thereof are virtually indistinguishable.

The core 4 has a bottom 4*a*, sides 4*b* to 4*e*, and a top 4*f*. The side 4*d* and the side 4*e* face each other in the first direction, the side 4*b* and the side 4*c* face each other in the second direction, and the side 4*a* and the top 4*f* face each other in the third direction. In the drawings, the X-axis corresponds to the first direction, the Y-axis corresponds to the second direction, and the Z-axis corresponds to the third direction.

Although a size of the core 4 is not particularly limited, its X-axis direction width is such as 1.0 to 7.0 mm, its Y-axis direction width is such as 1.0 to 7.0 mm, and its Z-axis direction width is such as 0.5-5.0 mm.

The core 4 is formed by a material containing a magnetic material and a resin. Examples of the magnetic material forming the core 4 include ferrite grains, metal magnetic grains, etc. Examples of the ferrite grains include Ni—Zn based ferrite and Mn—Zn based ferrite. The metal magnetic grains are not particularly limited, but Fe—Ni alloy powder, Fe—Si alloy powder, Fe—Si—Cr alloy powder, Fe—Co alloy powder, Fe—Si—Al alloy powder, amorphous iron, etc. are exemplified. The resin forming the core 4 is not particularly limited, but examples thereof include an epoxy resin, a phenol resin, a polyester resin, a polyurethane resin, a polyimide resin, other synthetic resins, and other non-magnetic materials. The core 4 may be a sintered body of a metallic magnetic material. Although the first layer 41 and the second layer 42 are preferably formed by the same material, they may be formed by different materials.

Figure 3:
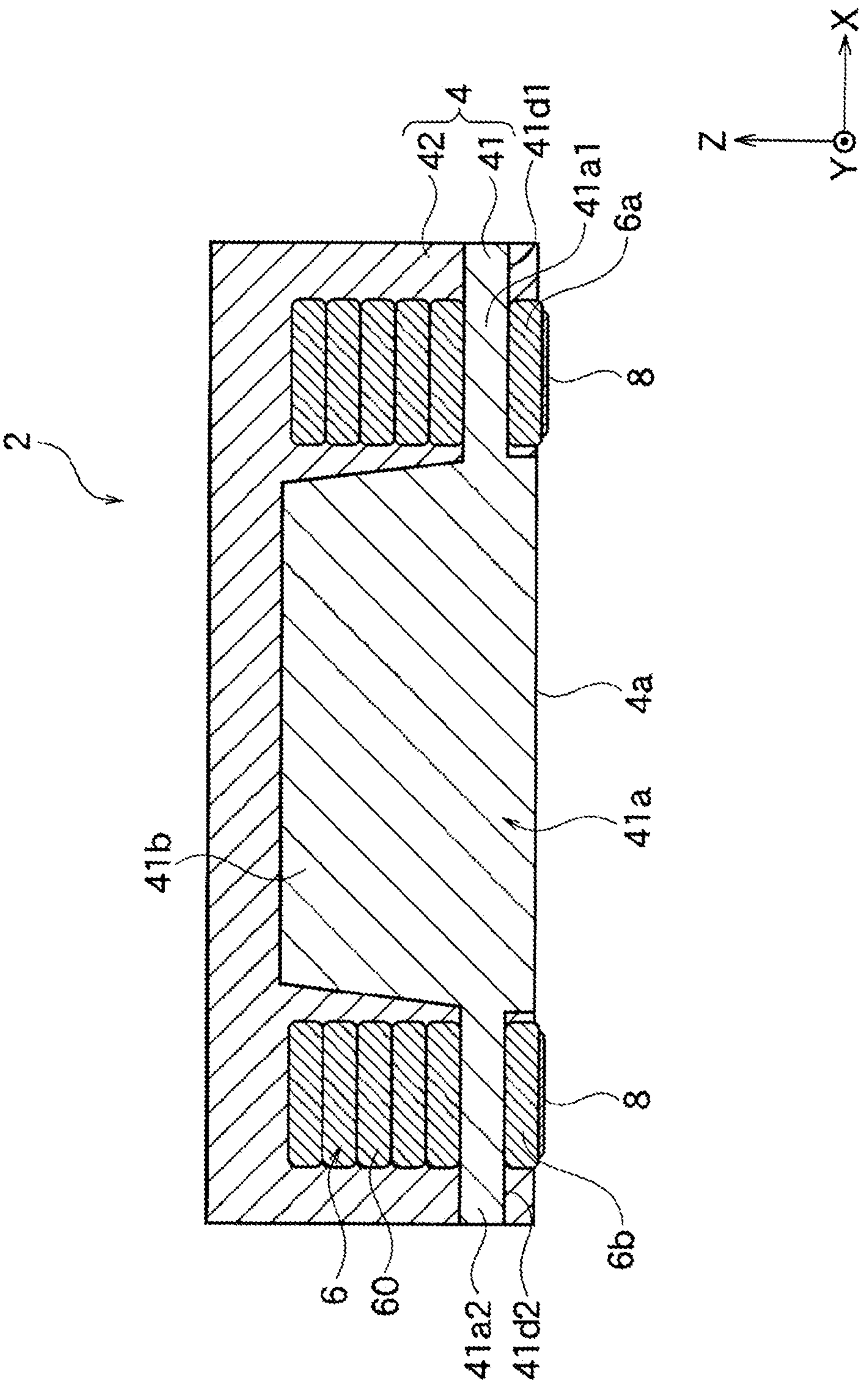
FIG. 3 is a cross-sectional view of the coil device along line shown in FIG. 1.

The first layer 41 has a support 41*a*, a winding core 41*b*, cutouts 41*c*1 to 41*c*3, and steps 41*d*1 and 41*d*2 (FIG. 3). The support 41*a* has a substantially flat plate shape and is formed in a substantially cross shape. The winding 60 can be placed on a top surface of the support 41*a*. That is, the support 41*a* mainly plays a role of supporting the winding 60. The support 41*a* has a first side 41*a*1, a second side 41*a*2, a third side 41*a*3, and a fourth side 41*a*4.

The first side 41*a*1 is located on the positive side of the X-axis than the winding core 41*b*. The second side 41*a*2 is located on the negative side of the X-axis direction than the winding core 41*b*. The third side 41*a*3 is located on the positive side of the Y-axis than the winding core 41*b*. The fourth side 41*a*4 is located on the negative side of the Y-axis than the winding core 41*b*. The first side 41*a*1 and the second side 41*a*2 are formed to be thinner than the third side 41*a*3 and the fourth side 41*a*4. As described below, this is because steps 41*d*1 and 41*d*2 (FIG. 3) are formed on the bottom surfaces of the first side 41*a*1 and the second side 41*a*2, respectively.

The winding core 41*b* is integrally formed on the top surface of the support 41*a*. The core 41*b* has a columnar shape protruding upward, and the winding 60 can be inserted from the above. The coil 6 can be installed on the winding core 41*b* by winding a wire around the outer peripheral surface of the winding core 41*b*.

The cutout 41*c*1 is formed where a first side 41*a*1 and a third side 41*a*3 intersect substantially at right angles. The cutout 41*c*2 is formed where a second side 41*a*2 and the third side 41*a*3 intersect substantially at right angles. The cutout 41*c*3 is formed where the first side 41*a*1 and a fourth side 41*a*4 intersect substantially at right angles. Although a detailed illustration is omitted, a cutout is also formed where the second side 41*a*2 and the fourth side 41*a*4 intersect substantially at right angles. These cutouts have a substantially rectangular shape when viewed from above, however, they can be cut into other shapes. Further, instead of these cutouts, through-holes penetrating the support 41*a* in the vertical direction may be formed at the four corners of the support 41*a*.

The cutout 41*c*1 serves as a passage for leading out the lead-out 6*a* drawn from the winding 60 to the bottom surface of the first side 41*a*1. The cutout 41*c*2 serves as a passage for drawing out the lead-out 6*b* led out from the winding 60 to the bottom surface of the second side 41*a*2. In addition, the cutouts 41*c*1 to 41*c*3 serve as passages for allowing a compacting material forming the second layer 42 to flow from the top surface to the bottom surface of the support 41*a*.

The step 41*d*1 is formed on the bottom surface of the first side 41*a*1 of the support 41*a* and extends along the Y-axis direction. The step 41*d*2 (FIG. 3) is formed on the bottom surface of the second side 41*a*2 of the support 41*a* and extends along the Y-axis direction. As shown in FIG. 3, the lead-out 6*a* is arranged at the step 41*d*1, and the lead-out 6*b* is arranged at the step 41*d*2.

The step heights of the steps 41*d*1 and 41*d*2 are smaller than the thicknesses of the lead-outs 6*a* and 6*b*, respectively. Thus, when the lead-out 6*a* is arranged on the step 41*d*1, the lead-out 6*a* protrudes downward from the bottom 4*a* of the core 4, and a part of the lead-out 6*a* is arranged below the bottom 4*a*. Further, when the lead-out 6*b* is arranged at the step 41*d*2, the lead-out 6*b* protrudes downward from the bottom 4*a* of the core 4, and a part of the lead-out 6*b* is arranged below the bottom 4*a*.

As shown in FIG. 1, the second layer 42 covers the first layer 41. More specifically, the second layer 42 covers the top of the support 41*a* and fills the cutouts 41*c*1 to 41*c*3 and the steps 41*d*1 and 41*d*2. Of the bottom surfaces of the support 41*a*, the bottom surfaces of the third side 41*a*3 and the fourth side 41*a*4 may not be covered with the second layer 42.

Figure 2A:
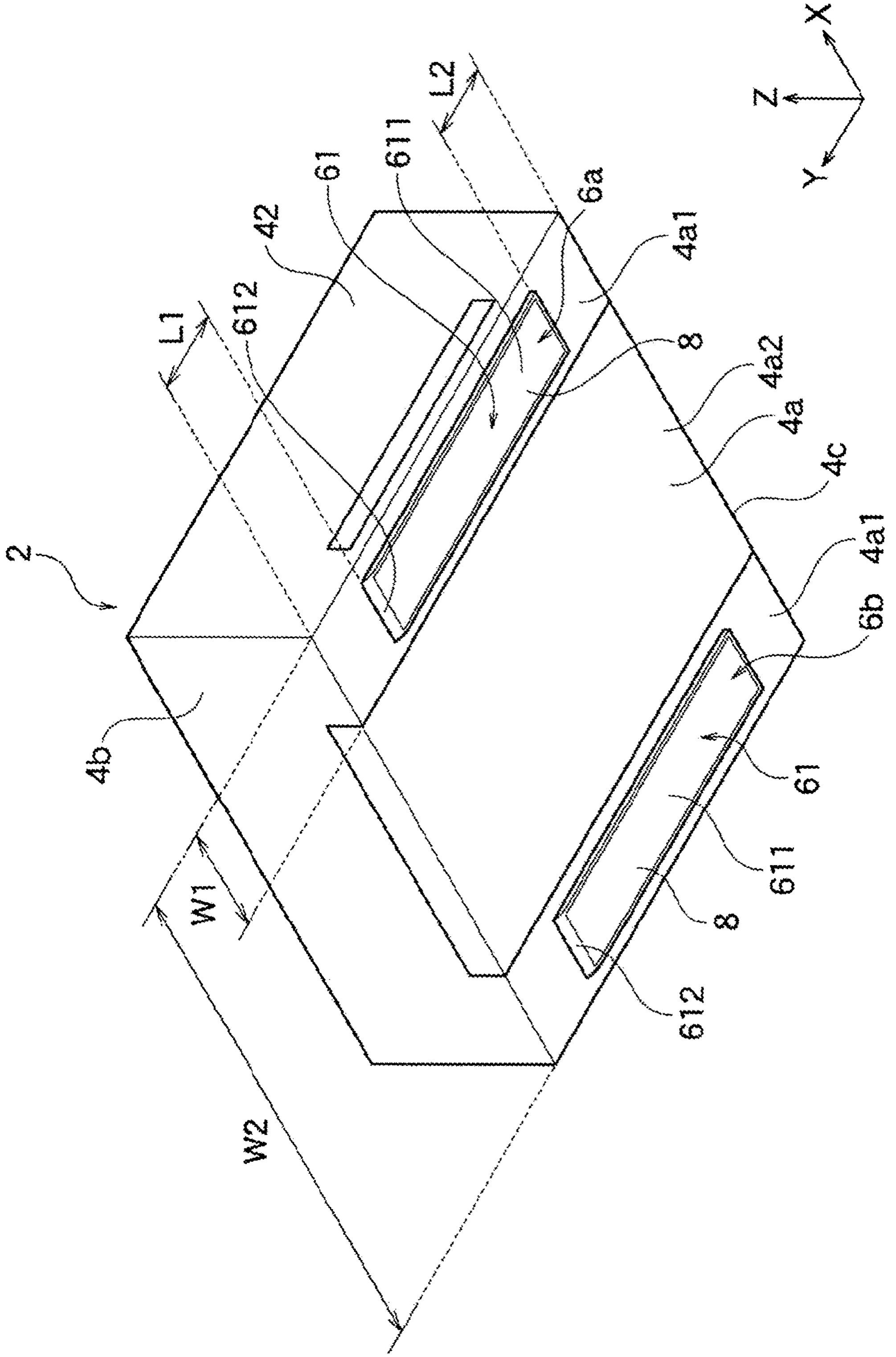
FIG. 2A is a perspective view of the coil device shown in FIG. 1 when viewed from a mounting surface side.

The bottom surface of the second layer 42 is substantially flush with the bottom surface of the support 41*a* at the steps 41*d*1 and 41*d*2 and the cutouts 41*c*1 to 41*c*3. Therefore, as shown in FIG. 2A, parts of each of the lead-outs 6*a* and 6*b* are exposed from the bottom surface (the bottom 4*a* of the core 4) of the second layer 42.

Figure 4A:
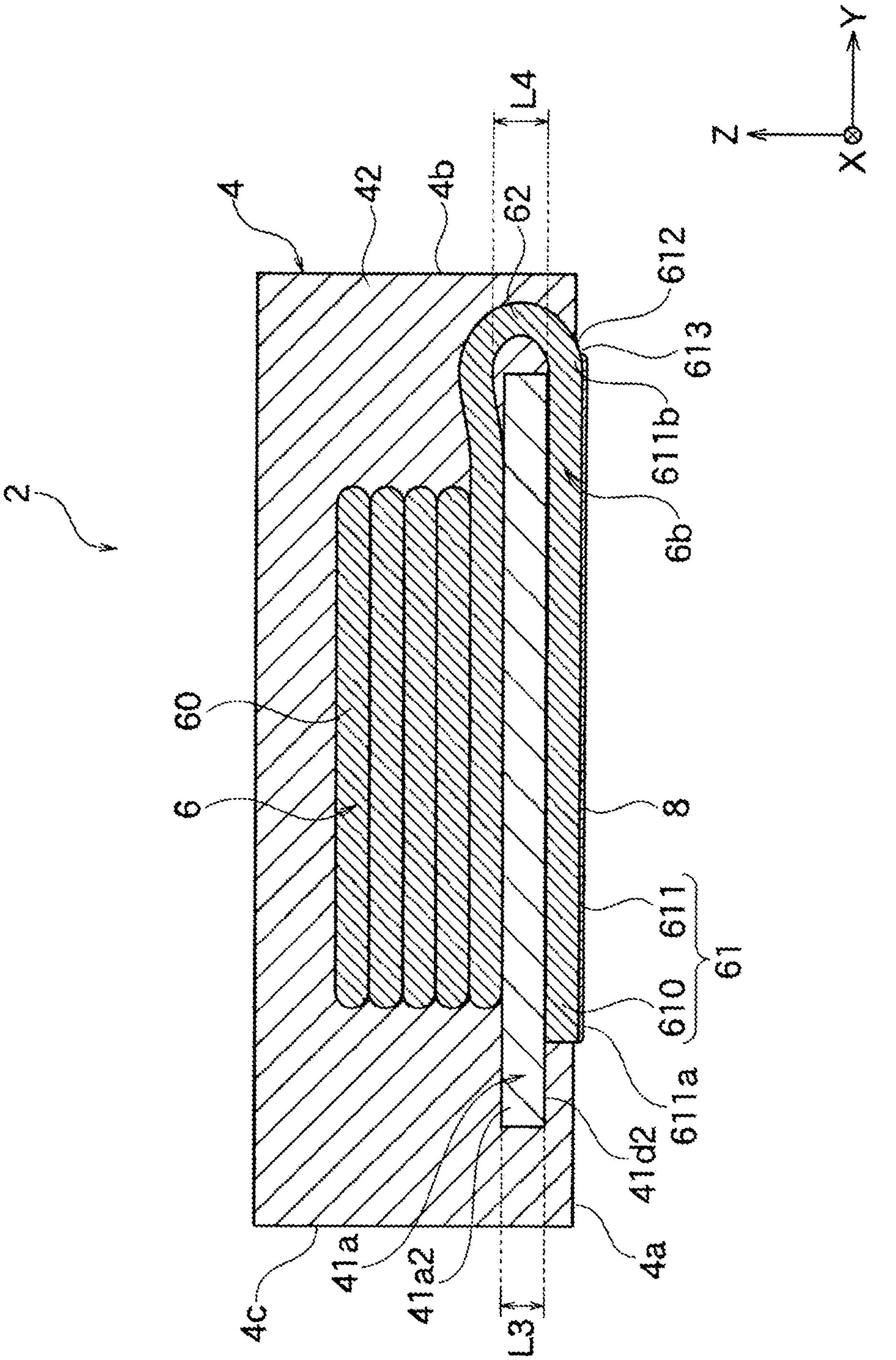
FIG. 4A is a cross-sectional view of the coil device along line IVA-IVA shown in FIG. 1.
Figure 4B:
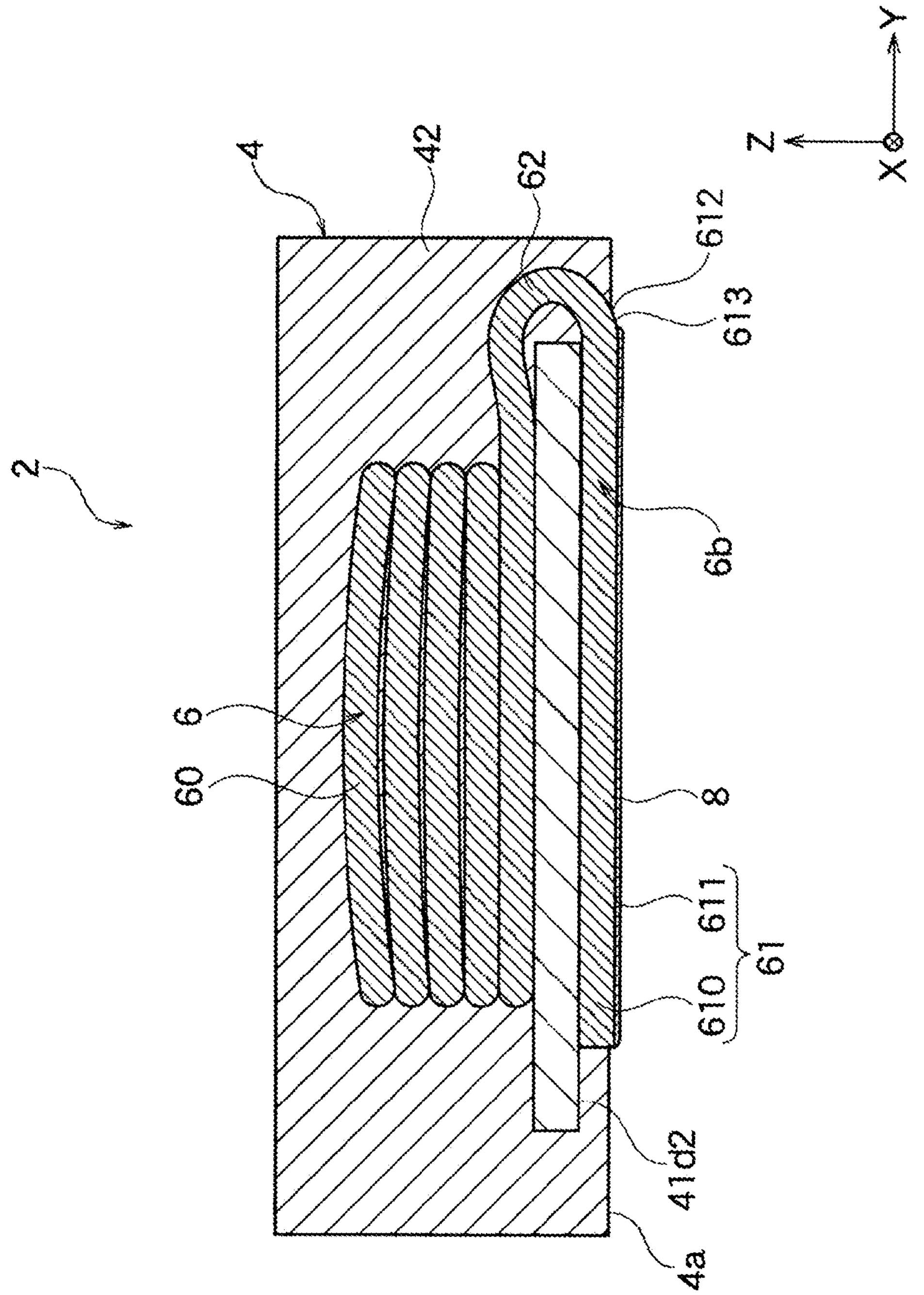
FIG. 4B is a cross-sectional view of a modified example of the coil device shown in FIG. 4A.

Next, the detailed configuration of the lead-outs 6*a* and 6*b* will be described. As shown in FIG. 1, the lead-out 6*a* has a terminal 61 and a connection 62. Similarly, as shown in FIG. 4A, the lead-out 6*b* has a terminal 61 and a connection 62.

The terminal 61 is arranged at the bottom 4*a* of the core 4. More specifically, the terminal 61 (FIG. 1) of the lead-out 6*a* is arranged at the bottom surface side of the first side 41*a*1, that is, on the step 41*d*1. The terminal 61 (FIG. 4A) of the lead-out 6*b* is arranged at the bottom surface side of the second side 41*a*2, that is, on the step 41*d*2.

The terminal 61 extends along the Y-axis direction. The end of the terminal 61 on the Y-axis negative direction side may be arranged on the Y-axis positive direction side than the end of the second side 41*a*2 on the Y-axis negative direction side. The terminal 61 extends linearly along the bottom 4*a* of the core 4 from one end to the other end in its extending direction. That is, the terminal 61 does not bend toward the inside of the core 4 and does not cut into the inside of the core 4.

Thereby, a volume of the core 4 can be increased, and the magnetic properties of the coil device 2 can be improved. Also, deterioration in quality of the coil device 2 due to bending of the terminal 61 can be prevented.

A first distance L1 (FIG. 2A) between the terminal 61 (exposed part 611 described later) and the side 4*b* of the core 4 and a second distance L2 (FIG. 2A) between the terminal 61 (exposed part 611 described later) and the side 4*c* of the core 4 may be different. For example, the second distance L2 may be longer than the first distance L1. In this case, a relatively large space is formed between the terminal 61 and the side 4 *c* of the core 4. As a result, it is possible to increase the thickness of the core 4 and prevent generation of cracks in the core 4.

The terminal 61 has an embedded part 610 and an exposed part 611. The embedded part 610 is embedded inside the core 4 (the second layer 42) and covered with the second layer 42 at the step 41*d*2. The top surface of the embedded part 610 may be fixed to the bottom surface of the second side 41*a*2 of the support 41*a*. Although FIG. 4A shows the terminal 61 of the lead-out 6*b*, the configuration of the terminal 61 of the lead-out 6*a* is similar to the configuration of the terminal 61 of the lead-out 6*b*, and that the detailed explanation thereof is omitted.

Figure 5A:
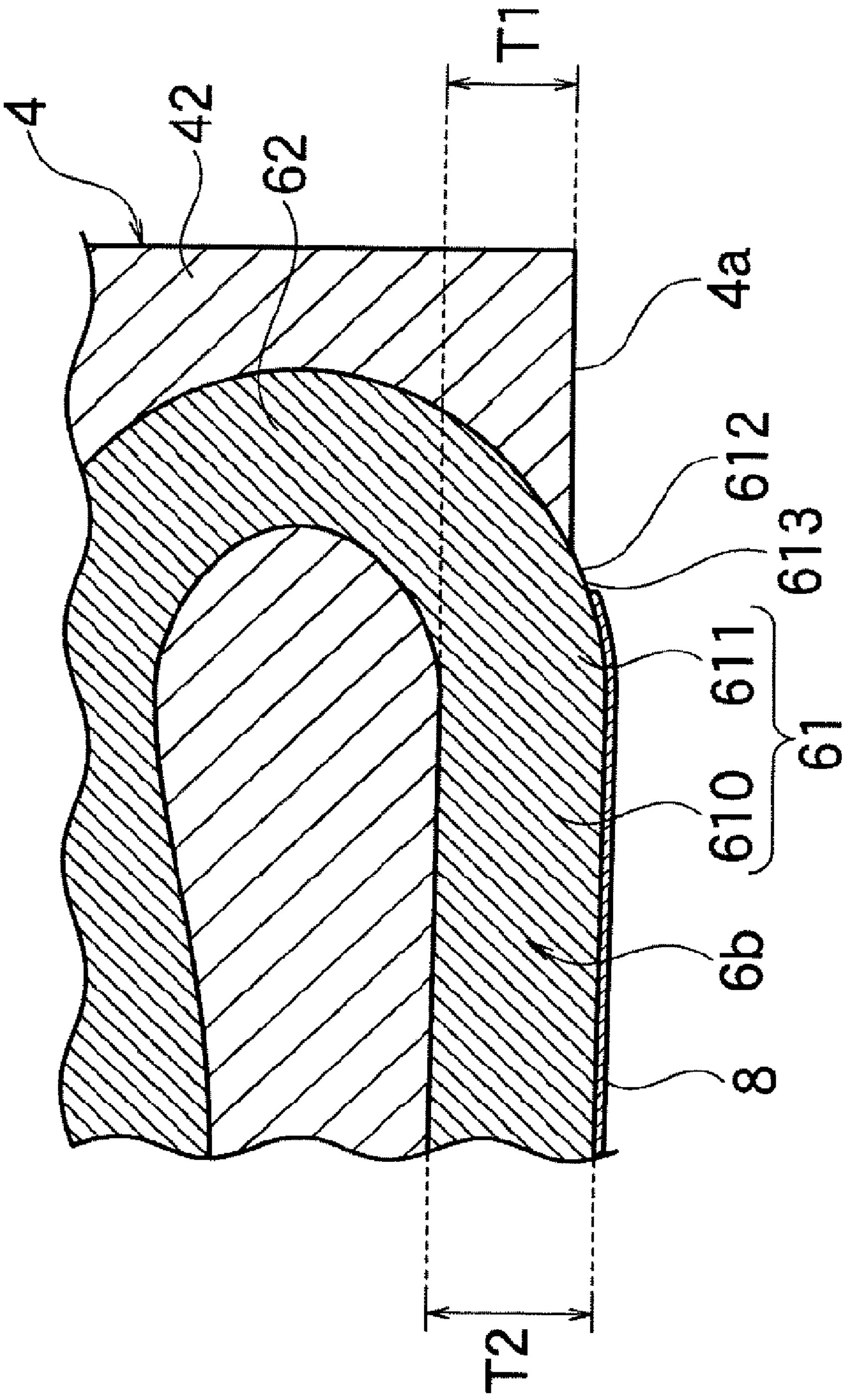
FIG. 5A is a partially enlarged cross-sectional view of the coil device shown in FIG. 4A.

As shown in FIG. 5A, the thickness T1 of the embedded part 610 is thinner than the thickness T2 of the terminal 61, is preferably ¼ or more and less than the thickness T2 of the terminal 61, and is more preferably ½ or more and ⅘ or less.

By setting the range of T1 to the range described above, it is possible to prevent the terminal 61 from peeling off from the bottom 4*a* of the core 4. In addition, since the thickness of the exposed part 611 (a part of the terminal 61 disposed outside the core 4) becomes relatively small, the height of the coil device 2 can be reduced.

The surface of the embedded part 610 is covered with an insulation film, not shown. As described above, the coil 6 is formed by an insulation coated wire, and an insulation coat is left unremoved at the embedded part 610. As a result, it is possible to prevent generation of a short circuit between the embedded part 610 and the core 4 (a magnetic material contained in the core 4).

As shown in FIG. 4A, the exposed part 611 is arranged outside the core 4. The exposed part 611 is exposed downward from the bottom 4*a* of the core 4. The width of the exposed part 611 in the X-axis direction is substantially equal to the width of the embedded part 610 in the X-axis direction. The width of the exposed part 611 in the Y-axis direction is substantially equal to the width of the embedded part 610 in the Y-axis direction. The exposed part 611 extends along the Y-axis direction and has a substantially rectangular shape when viewed from the bottom 4*a* side of the core 4 (See FIG. 2A).

As shown in FIG. 2A, a magnetic material-rich part 4*a*1 containing a relatively large amount of magnetic material is formed around the exposed part 611. The magnetic material rich-part 4*a*1 is formed around each exposed part 611 of the lead-outs 6*a* and 6*b*. In other words, the exposed part 611 is exposed from the magnetic material-rich part 4*a*1.

Further, in the area between the magnetic material-rich part 4*a*1 surrounding the exposed part 611 of the lead-out 6*a* and the magnetic material-rich part 4*a*1 surrounding the exposed part 611 of the lead-out 6*b*, a resin-rich part 4*a*2 having a relatively large resin content is formed. The resin-rich part 4*a*2 contains more resin than the magnetic material-rich part 4*a*1. In addition, the magnetic material-rich part 4*a*1 contains more magnetic material than the resin-rich part 4*a*2. The magnetic material-rich part 4*a*1 and the resin-rich part 4*a*2 are formed at the bottom 4*a* of the core 4.

Laser irradiation is exemplified as a method for forming the magnetic material-rich part 4*a*1. By irradiating a predetermined range (the exposed part 611 and its surroundings) of the bottom 4*a* of the core 4 with laser, the resin around the exposed part 611 (the resin of the core 4 or the insulation coat covering the metal grains) is blown off. As a result, the magnetic material content becomes relatively higher than the resin content in the exposed part 611 and its surroundings (laser irradiation surface), and magnetic material-rich part 4*a*1 is formed. The insulation coat on the surface of the exposed part 611 is removed by laser irradiation.

The magnetic material-rich part 4*a*1 has a substantially rectangular shape when viewed from the bottom 4*a* side of the core 4. The width of the magnetic material-rich part 4*a*1 in the X-axis direction is longer than the width of the lead-out 6*a* or 6*b* in the X-axis direction, and the width of the magnetic material-rich part 4*a*1 in the Y-axis direction is longer than the width of the lead-out 6*a* or the exposed part 611 in the Y-axis direction.

A ratio W1/W2 of the width W1 of the magnetic material-rich part 4*a*1 in the X-axis direction and the width W2 of the core 4 in the X-axis direction is preferably ⅛ to ⅓. By setting the value of the ratio W1/W2 within the above range, it is possible to avoid fluctuations in the magnetic properties of the coil device 2 due to a decrease in the resin content in the core 4.

In the magnetic material-rich part 4*a*1, the resin of the bottom 4*a* is blown off by laser irradiation, so the surface roughness of the bottom 4*a* of the core 4 in the magnetic material-rich part 4*a*1 is more than the surface roughness of the bottom 4*a* of the core 4 in the resin-rich part 4*a*2. The surface roughness (arithmetic mean height) Sa of the bottom 4*a* in the magnetic material-rich part 4*a*1 is, for example, 2.3 to 2.9 μm. On the other hand, the surface roughness (arithmetic mean height) Sa of the bottom 4*a* in the resin-rich part 4*a*2 is, for example, 1.0 to 2.0 μm. In addition, the difference between the surface roughness of the bottom 4*a* in the magnetic material-rich part 4*a*1 and the surface roughness of the bottom 4*a* in the resin-rich part 4*a*2 is, for example, 0.9 to 1.7 μm.

The surface roughness Sa is measured by a laser microscope (VK-X1000) manufactured by Keyence Corporation at a magnification of 1000 times to obtain the measured values of the surface roughness at three points in an inner part of the magnetic material-rich part 4*a*1. Then, the average value thereof was used as the value of the surface roughness Sa of the bottom 4*a* in the magnetic material-rich part 4*a*1. Similarly, measured values of surface roughness at three points in the inner part of the resin-rich part 4*a*2 were obtained, and the average value thereof was used as the value of the surface roughness Sa of the bottom 4*a* of the resin-rich part 4*a*2.

As shown in FIG. 4A, the shapes of the first end 611*a* (the end in the Y-axis negative direction side) of the exposed part 611 and the second end 611*b* (the end in the Y-axis positive direction side) of the exposed part 611 may be different. The surface of the exposed part 611 is flat at the first end 611*a*. On the other hand, as shown in FIG. 5A, the surface of the exposed part 611 at the second end 611*b* may be formed with a curved surface 612 that curves toward the bottom 4*a* of the core 4.

As a result, for example, when connecting the exposed part 611 to the mounting substrate by soldering, it is possible to form a thick solder on the curved surface 612 and increase the connection strength between the exposed part 611 and the mounting substrate. A tapered surface may be formed on the surface of the exposed part 611 instead of the curved surface 612.

The thickness of the exposed part 611 is preferably ⅕ or more and ½ or less of the thickness T2 of the terminal 61. By setting the range of the thickness of the exposed part 611 within the above range, it becomes easier to connect the exposed part 611 to the mounting substrate. Also, when producing the coil device 2, it becomes easier to form the metal layer 8 on the surface of the exposed part 611.

As shown in FIG. 4A, the connection 62 is embedded inside the core 4 (the second layer 42) and connects the winding 60 and the terminal 61. The connection 62 has a bent shape (an R shape), and extends from the winding 60 to the terminal 61 while turning about 180 degrees from the Y-axis positive direction side toward the Y-axis negative direction side.

More specifically, as shown in FIGS. 1 and 4A, the connection 62 of the lead-out 6*a* is led out from the upper end of the winding 60 to the vicinity of the side 4*b* of the core 4. Also, the connection 62 of the lead-out 6*b* is led out from the lower end of the winding 60 to the vicinity of the side 4*b* of the core 4.

In addition, each connection 62 of the lead-outs 6*a* and 6*b* is bent in the Z-axis direction near the side 4*b* of the core 4 and is led out near the bottom 4*a* of the core 4.

Further, the connection 62 of the lead-out 6*a* is bent in the Y-axis direction near the bottom 4*a* of the core 4 (cutout 41*c*1) and connected to the terminal 61 near the step 41*d*1. The connection 62 of the lead-out 6*b* is bent in the Y-axis direction near the bottom 4*a* of the core 4 (cutout 41*c*2) and connected to the terminal 61 near the step 41*d*2.

As shown in FIG. 4A, with respect to the Z-axis direction, the distance L3 between the terminal 61 and the winding 60 is shorter than the inner diameter (a bending diameter) L4 at the bent part (a folded part) of the connection 62. Therefore, it is possible to make the curvature radius of the curved shape provided at the connection 62 relatively large, and reduce the mechanical load applied to the connection 62 when forming the shape.

A metal layer 8 is formed on the surface of the exposed part 611. The metal layer 8 is a part connected to the substrate, and is formed of a plated film. Therefore, the metal layer 8 has a solder wettability and assists the connection between the exposed part 611 and the mounting substrate. Examples of the plated films include metals such as Sn, Au, Ni, Pt, Ag, and Pd, and alloys thereof. Note that the metal layer 8 may be formed by a method such as sputtering. The thickness of the metal layer 8 is preferably 3-30 μm. The thickness of metal layer 8 is preferably thinner than the thickness of the exposed part 611 of the terminal 61.

The width of the metal layer 8 in the Y-axis direction is substantially equal to the width of the exposed part 611 in the Y-axis direction, and the width of the metal layer 8 in the X-axis direction is substantially equal to the width of the exposed part 611 in the X-axis direction. That is, the metal layer 8 preferably covers the whole area of the exposed part 611. However, as shown in FIG. 5A, the metal layer 8 does not have to exist on the curved surface 612 of the exposed part 611 at a position spaced apart from the bottom surface of the metal layer 8 toward the bottom 4*a* of the core 4. Hereinafter, an area where the metal layer 8 does not exist is referred to as a metal layer non-formed part 613.

The metal layer non-formed part 613 mainly serves to adjust the area of the metal layer 8. That is, by providing the metal layer non-formed part 613 in the exposed part 611, the area (an effective metal layer) of the metal layer 8 that substantially contributes to the connection with the mounting substrate can be adjusted. As a result, the area of the effective metal layer can be adjusted according to the area of the land pattern of the mounting substrate. At the metal layer non-formed part 613, the insulation coat may be formed on the surface of the exposed part 611 (a curved surface 612).

Although the metal layer 8 is formed on the surface of the exposed part 611, it is not formed on the surface of the embedded part 610. This is to prevent a short-circuit failure between the embedded part 610 and the magnetic material inside the core 4.

Next, a producing method for the coil device 2 is described. According to the method of the embodiment, a first layer compact 410 (FIG. 6A) corresponding to the first layer 41 shown in FIG. 1 and a multiple coils 6 wound in an air-core coil shape are firstly prepared.

Figure 6A:
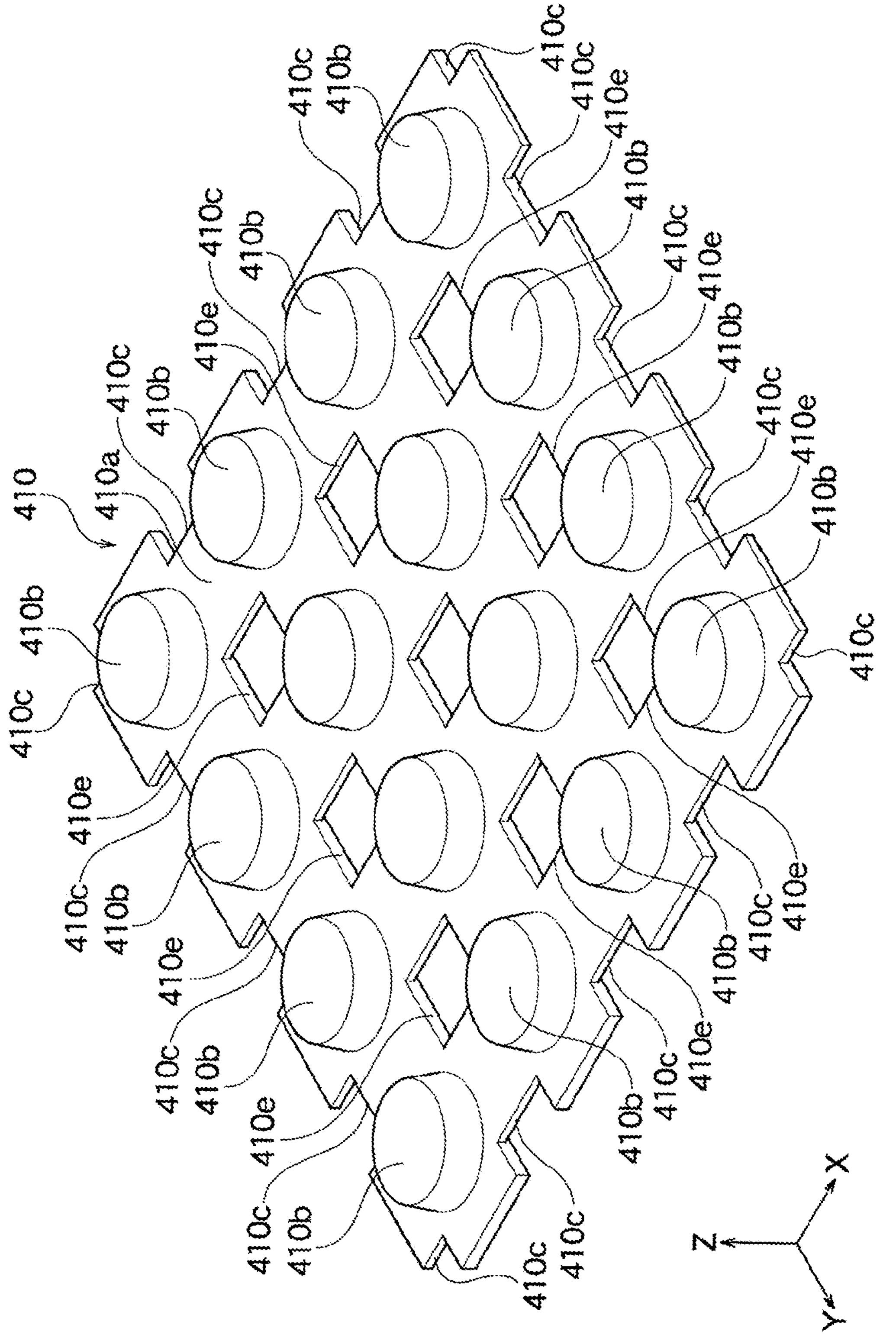
FIG. 6A is a view showing a producing step of the coil device shown in FIG. 1.

As shown in FIG. 6A, the first layer compact 410 has a shape in which a plurality of the first layers 41 are connected. The first layer compact 410 can be obtained by green compacting, injection molding, or machining.

Figure 6B:
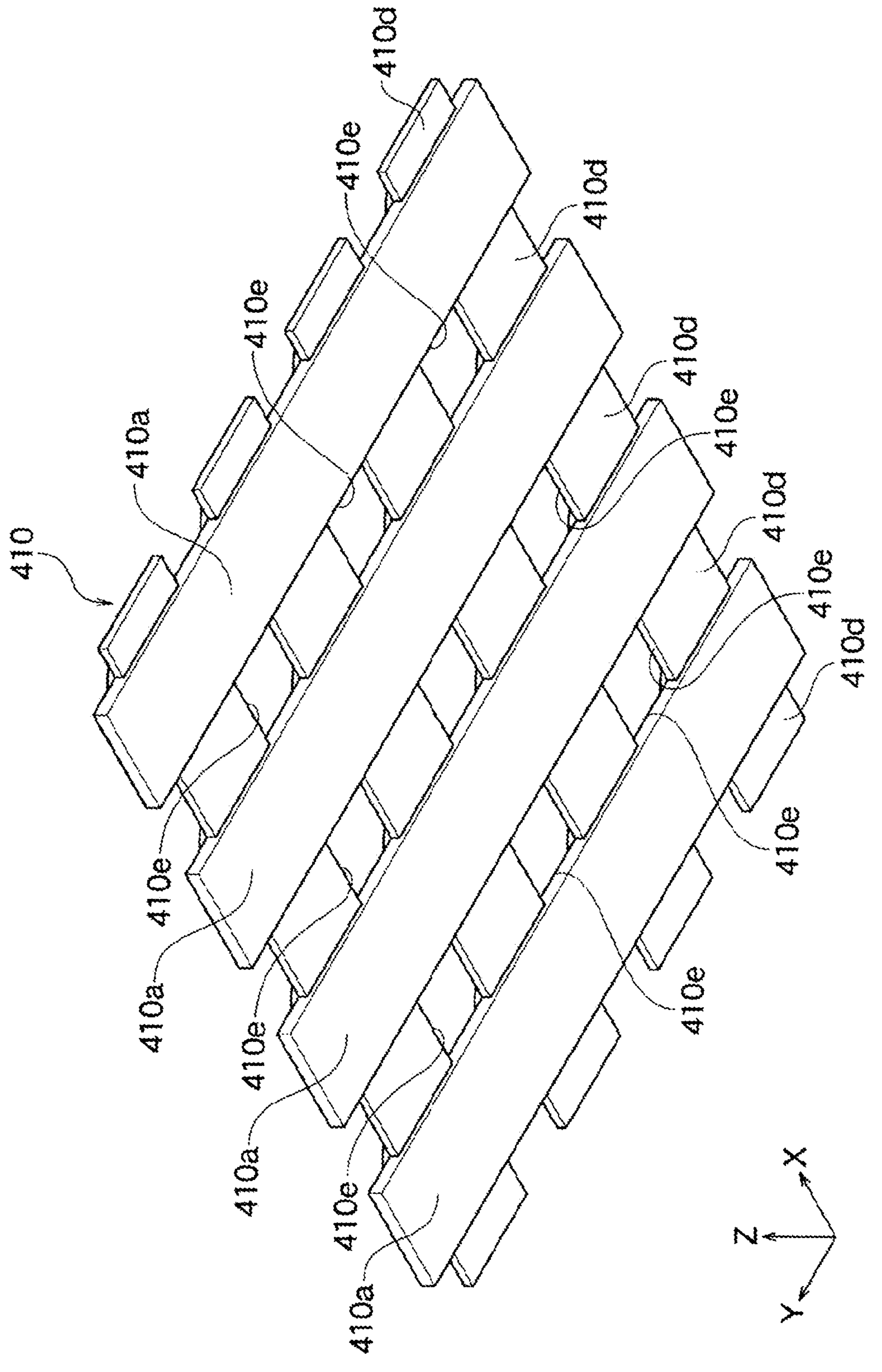
FIG. 6B is a view of the first layer compact shown in FIG. 6A viewed from another angle.

As shown in FIGS. 6A and 6B, the first layer compact 410 includes a support 410*a*, a plurality of winding cores 410*b*, a plurality of cutouts 410*c*, a plurality of steps 410*d*, and a plurality of through holes 410*e*.

The support 410*a* has a shape in which a plurality of supports 41*a* (FIG. 1) are connected. The cutout 410*c* and the through hole 410*e* are used as a passage for compacting materials forming the second layer 420 to flow inside the press mold, as will be described later. The step 410*d* is mainly used for arranging the lead-outs 6*a* and 6 *b* of the coil 6.

Figure 6C:
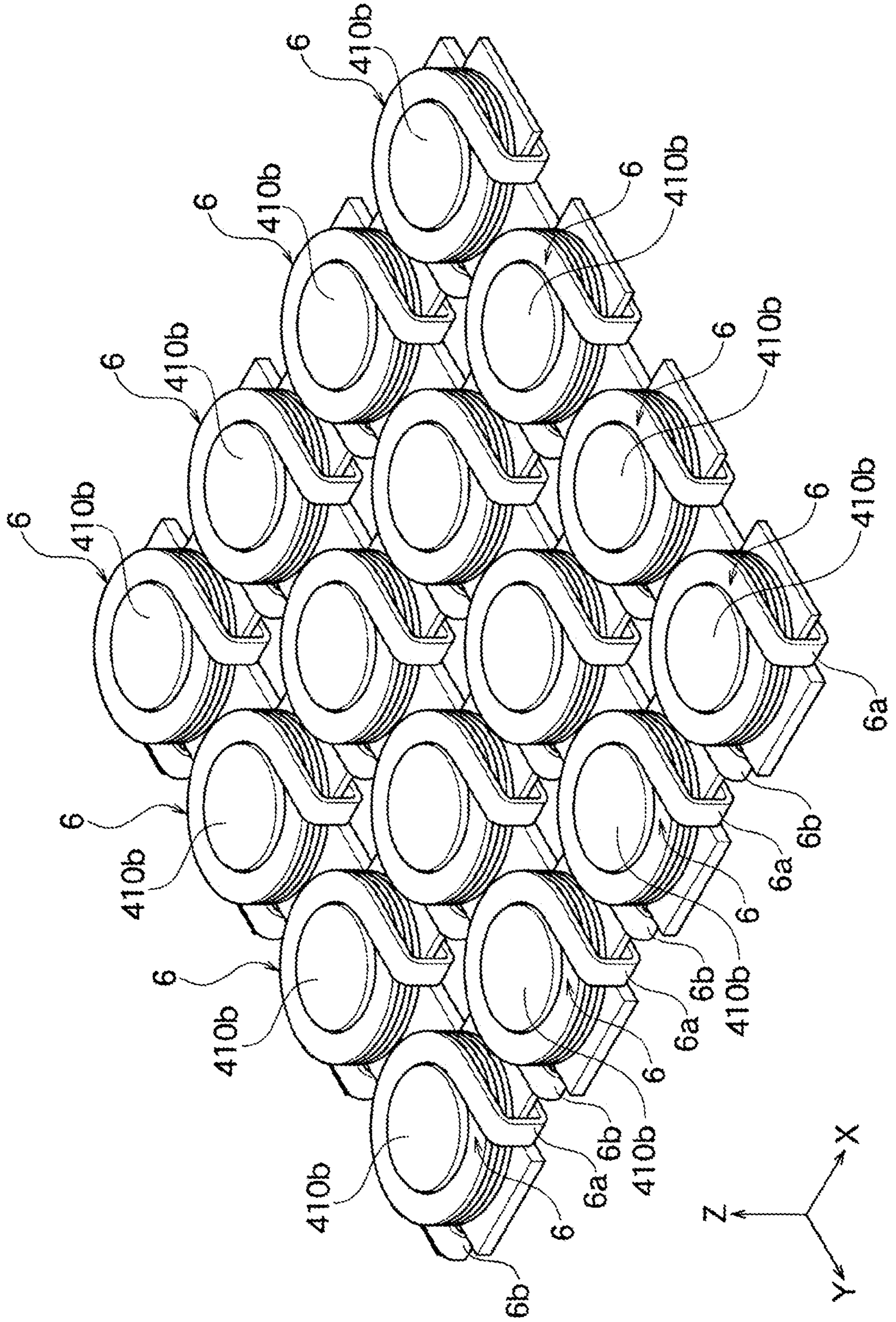
FIG. 6C is a view showing a step subsequent to the step shown in FIG. 6A.
Figure 6D:
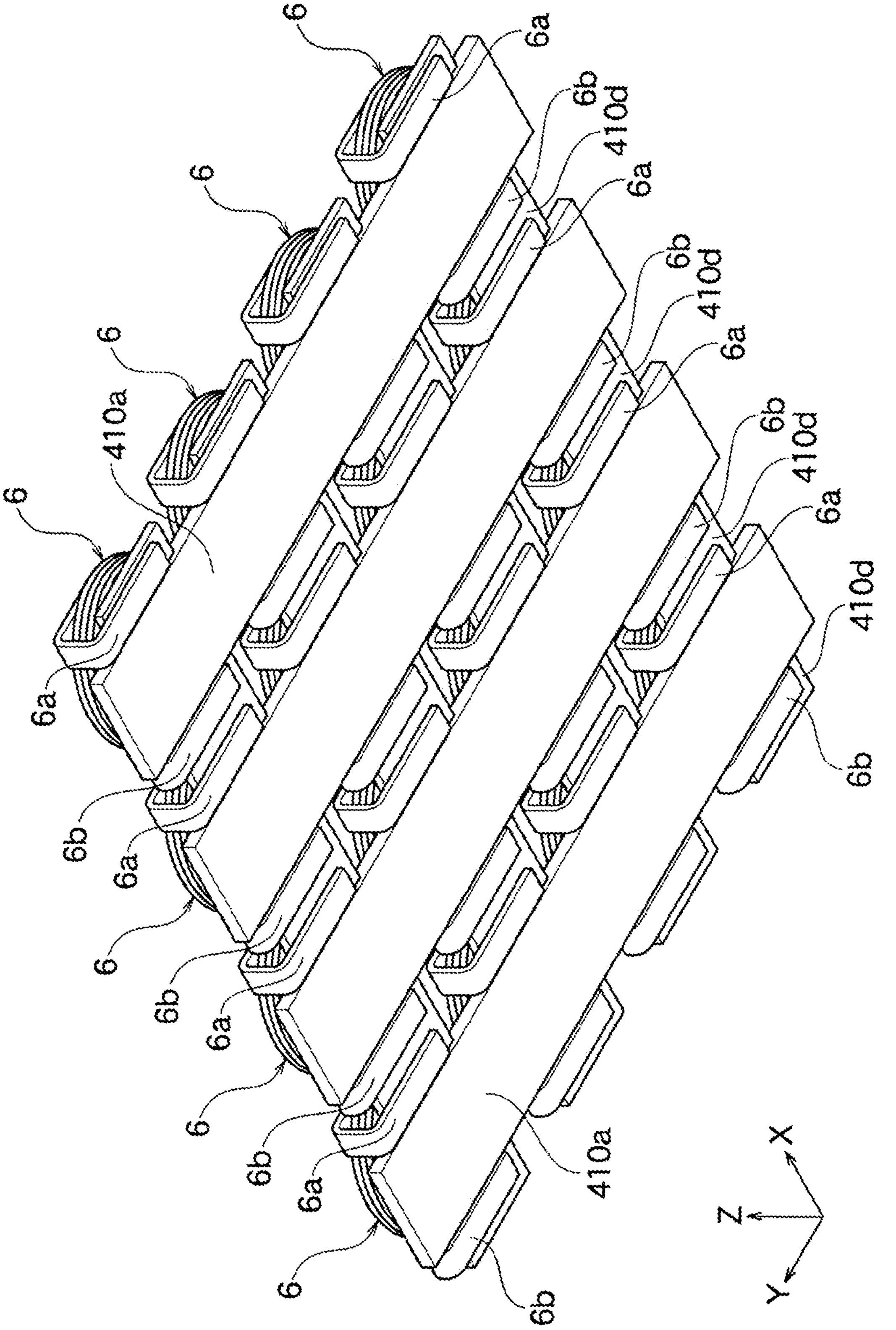
FIG. 6D is a view of the first layer compact shown in FIG. 6C viewed from another angle.

Next, as shown in FIGS. 6C and 6D, the coil 6 is arranged on the winding core 410*b*. Note that the wire 6 may be wound around the outer peripheral surface of the winding core 410*b*. Next, the lead-outs 6*a* and 6*b* of the coil 6 are led out toward the bottom surface of the first layer compact 410 and placed on the step 410*d*.

Figure 6E:
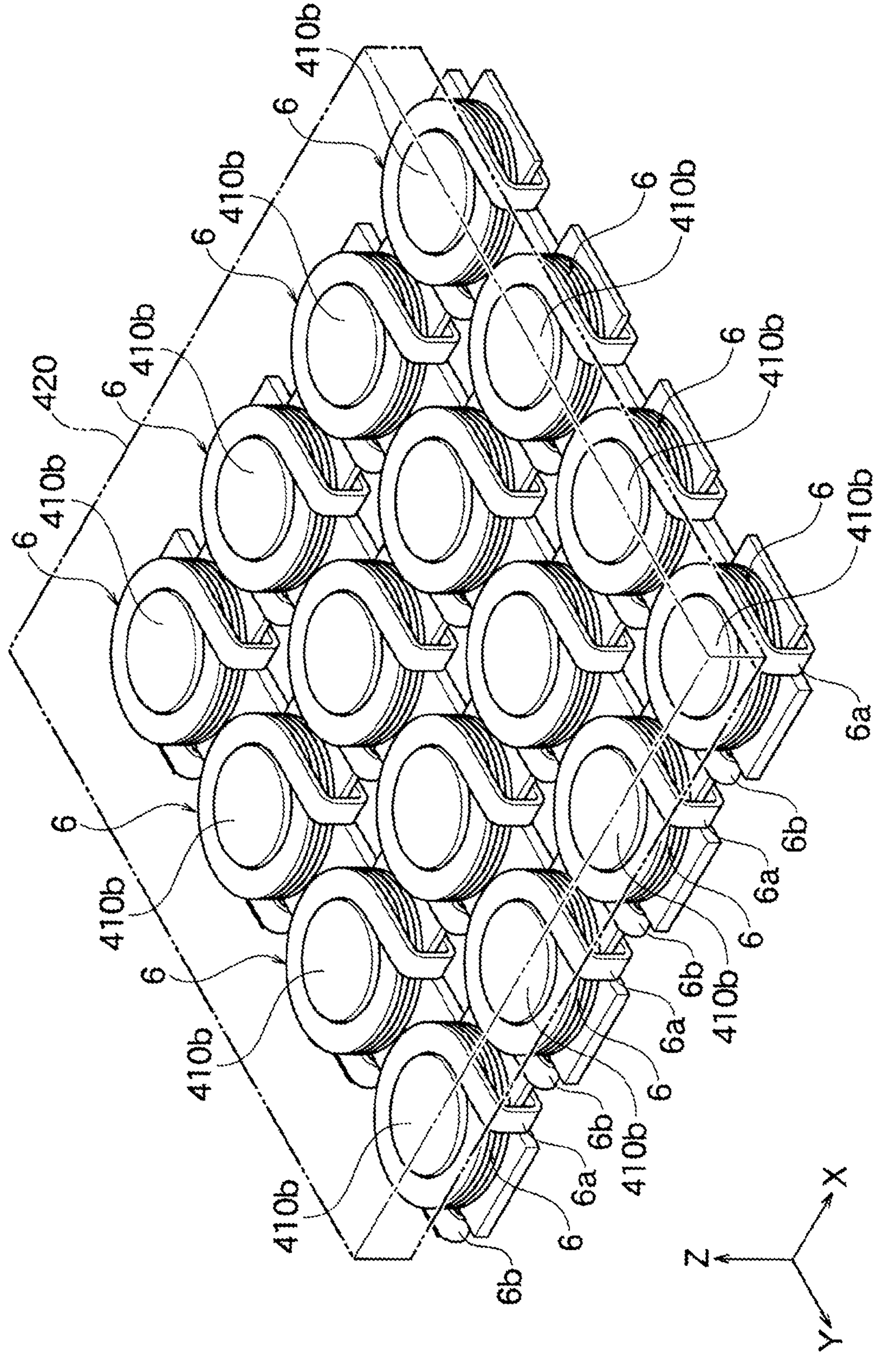
FIG. 6E is a view showing a step subsequent to the step shown in FIG. 6C.
Figure 6F:
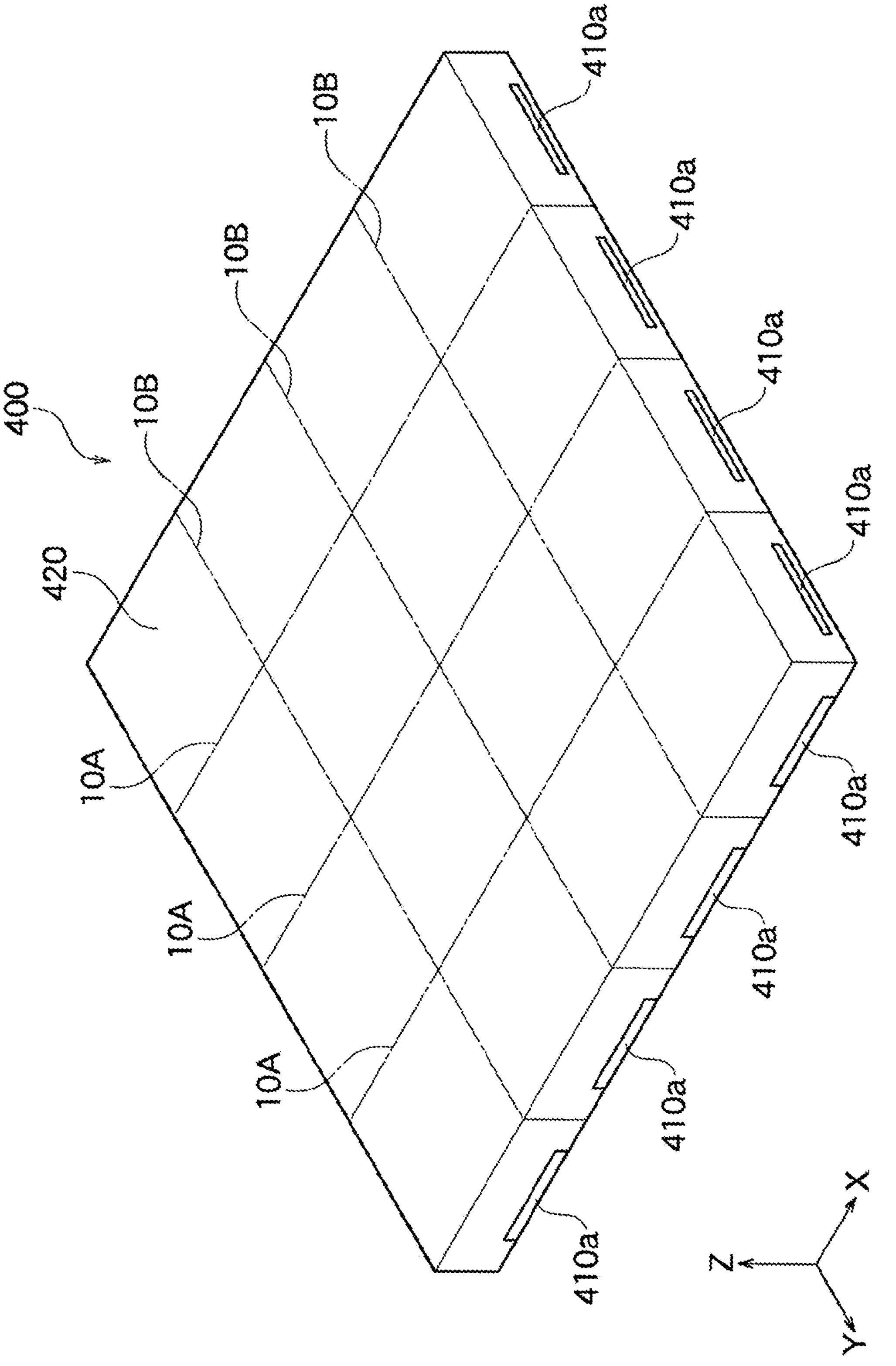
FIG. 6F is a view showing a step subsequent to the step shown in FIG. 6E.

Next, the first layer compact 410 with the coil 6 arranged thereon is placed in a press mold. In addition, the first layer compact 410 is covered with the second layer 420 (FIG. 6E) so that the lead-outs 6*a* and 6*b* are partially exposed, and the substrate 400 of the first layer compact 410 and the second layer 420 are formed (FIG. 6F).

The method for compacting the second layer 420 is not particularly limited, however, insert injection molding, in which the first layer compact 410 is placed inside the press mold and pressed thereof, is exemplified. According to this compacting, the compacting material forming the second layer 420 flows from the front surface to the rear surface of the first layer compact 410 through the cutout 410*c* or the through hole 410*e* shown in FIG. 6A, and can be distributed inside the step 410*d*. In addition, as a material constituting the second layer 420, a material having fluidity during compacting is used, and a composite magnetic material using a thermoplastic resin or a thermosetting resin as a binder is used.

Figure 6G:
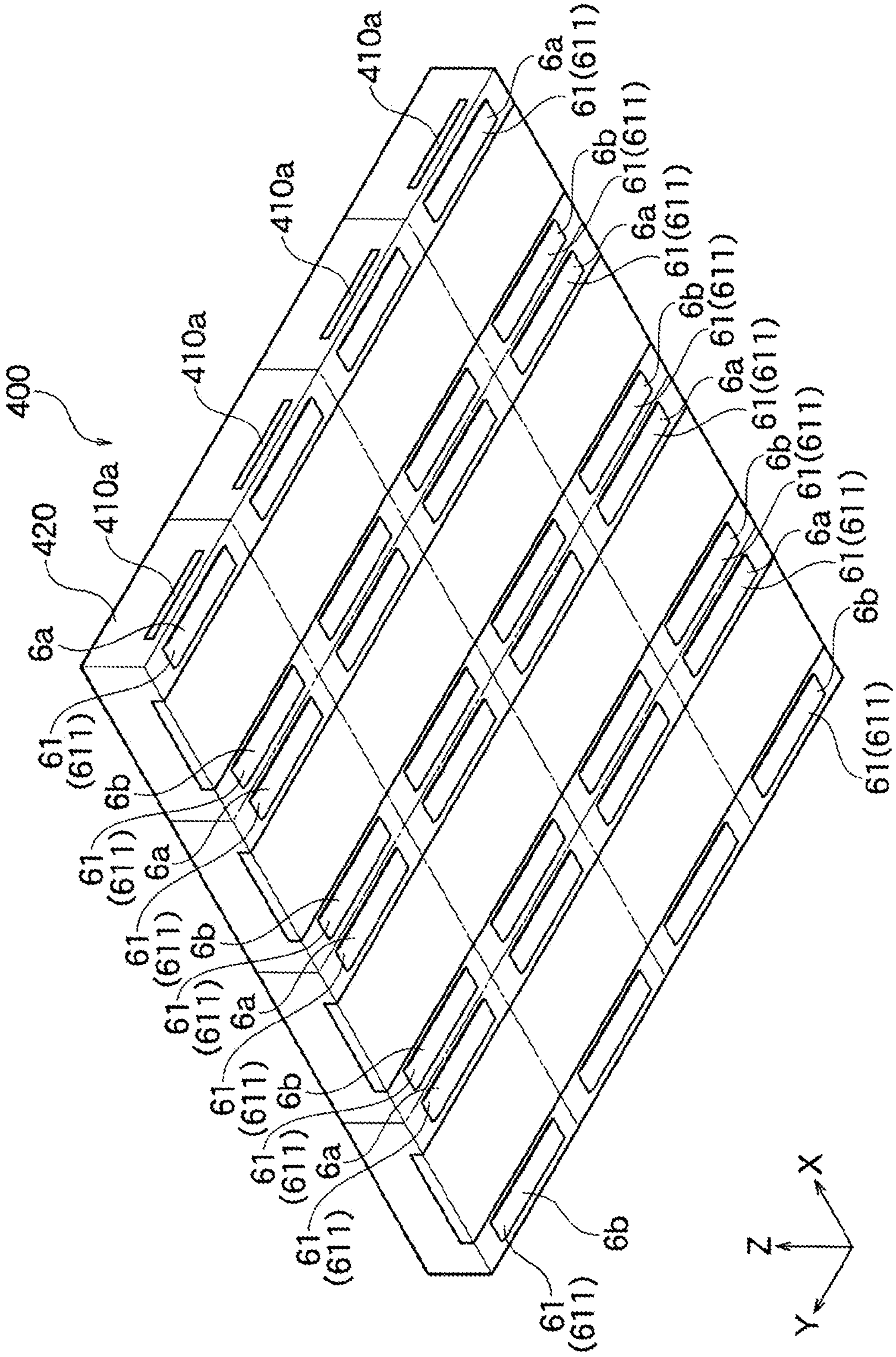
FIG. 6G is a view of the substrate shown in FIG. 6F viewed from another angle.

Here, the step height of the step 410*d* shown in FIG. 6B is smaller than the thickness of the wire forming the coil 6. Therefore, when the first layer compact 410 is covered with the second layer 420 (FIG. 6E), a part of each of the lead-outs 6*a* and 6*b* is exposed from the bottom surface of the substrate 400 as shown in FIG. 6G. That is, the part exposed from the bottom surface of the substrate 400 becomes the exposed part 611 of the terminal 61 shown in FIG. 4A.

Next, a predetermined range at the bottom surface of the substrate 400 is irradiated with a laser by a predetermined intensity to remove the insulation coat of the exposed parts 611 of the lead-outs 6*a* and 6*b* exposed from the bottom surface of the substrate 400. Next, the substrate 400 is cut along the planned cutting lines 10A and 10B shown in FIG. 6F to separate the substrate 400 into pieces. Thereby, a core 4 having a single coil 6 embedded therein as shown in FIG. 1 can be obtained.

Next, a barrel polishing is performed on a plurality of individuated cores 4. Next, by forming metal layer 8 on the surfaces of each exposed part 611 of lead-outs 6*a* and 6*b* by plating, coil device 2 shown in FIG. 1 can be obtained.

As described above, according to the embodiment, the metal layer 8 is formed on the surface of the exposed part 611 as shown in FIG. 4A. Therefore, it is possible to mount the coil device 2 on the mounting substrate via the metal layer 8. Therefore, it is not necessary to form a terminal electrode on the bottom 4*a* of the core 4 separately from the metal layer 8. Thus, the coil device 2 can be easily produced and the production cost can be reduced.

In addition, since the terminal 61 is exposed from the core 4 as the exposed part 611, the exposed part 611 can contribute to connection with the mounting substrate. In addition, since the terminal 61 is embedded inside the core 4 as the embedded part 610. Thus, a gap, a space in which plating solution, flux, or the like may enter, between the terminal 61 and the bottom 4*a* of the core 4 does not exist. Therefore, it is possible to prevent the lead-outs 6*a* and 6*b* from being corroded due to the residue of the plating solution and the flux, and quality and reliability of the coil device 2 can be improved.

In addition, since the embedded part 610 is fixed to the core 4 inside the core 4, the fixing strength between the terminal 61 and the core 4 is increased, and the terminal 61 is prevented from peeling off from the bottom 4*a* of the core 4.

In addition, since the coil 6 is formed of an insulation coated flat wire, the surface areas of the exposed part 611 and the metal layer 8 formed on the surface thereof are increased, and the connection strength between the metal layer 8 and the mounting substrate can be improved.

Second Embodiment

Figure 7:
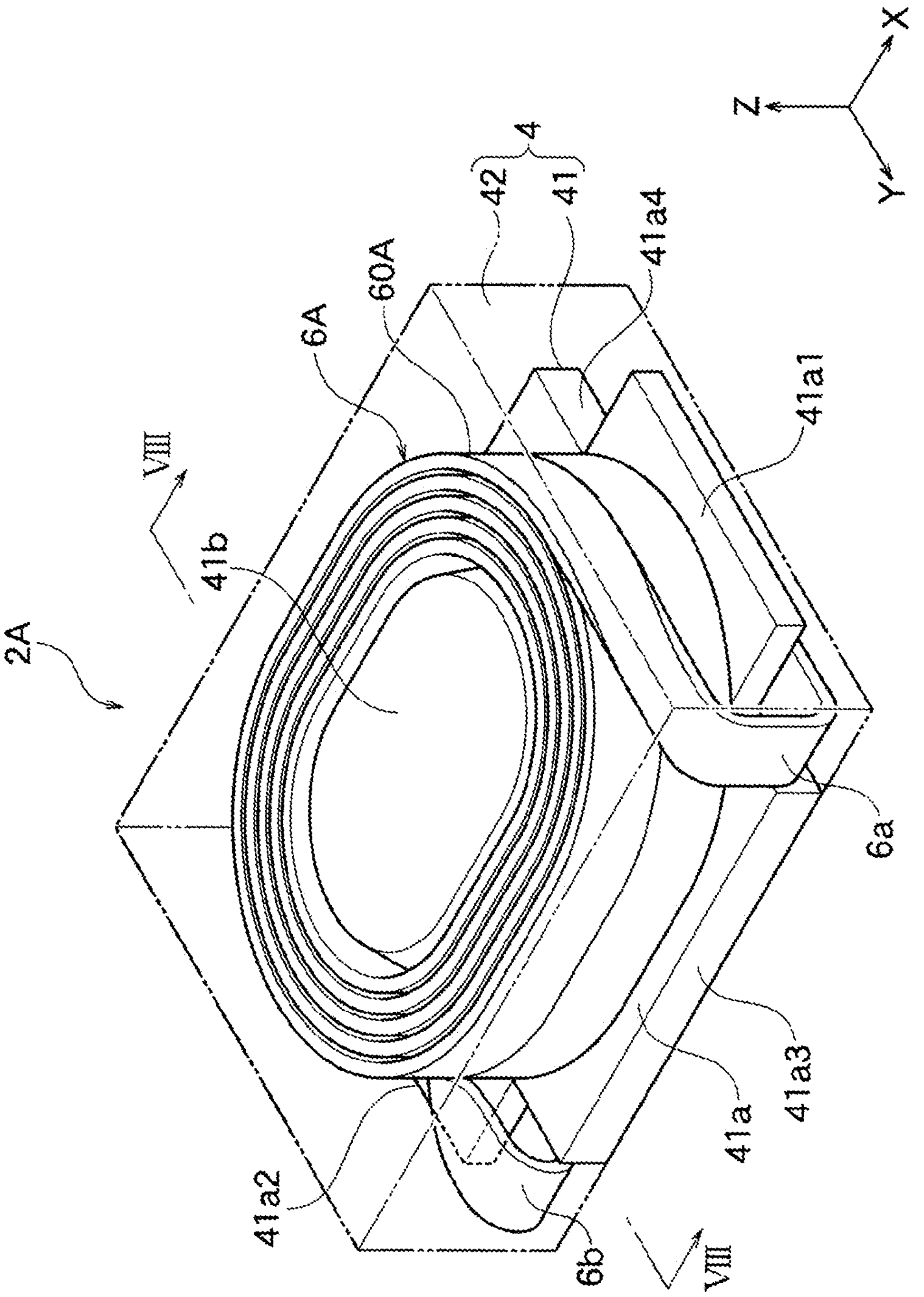
FIG. 7 is a perspective view of a coil device according to a second embodiment of the invention.

A coil device 2A according to the second embodiment of the invention shown in FIG. 7 has the same configuration as the coil device 2 of the first embodiment except for the followings. In FIG. 7, members that overlap with the coil device 2 of the first embodiment are denoted by the same reference numerals, and detailed description thereof will be omitted.

The coil device 2A has a coil 6A. The coil 6A is formed by crosswise winding a flat wire. The coil 6A has a winding 60A, and the winding 60A is formed to have a substantially elliptical shape when viewed from above. The lead-outs 6*a* and 6*b* are led out toward the bottom 4*a* of the core 4 in a twisted manner from above and below the winding 60A, respectively.

Figure 8:
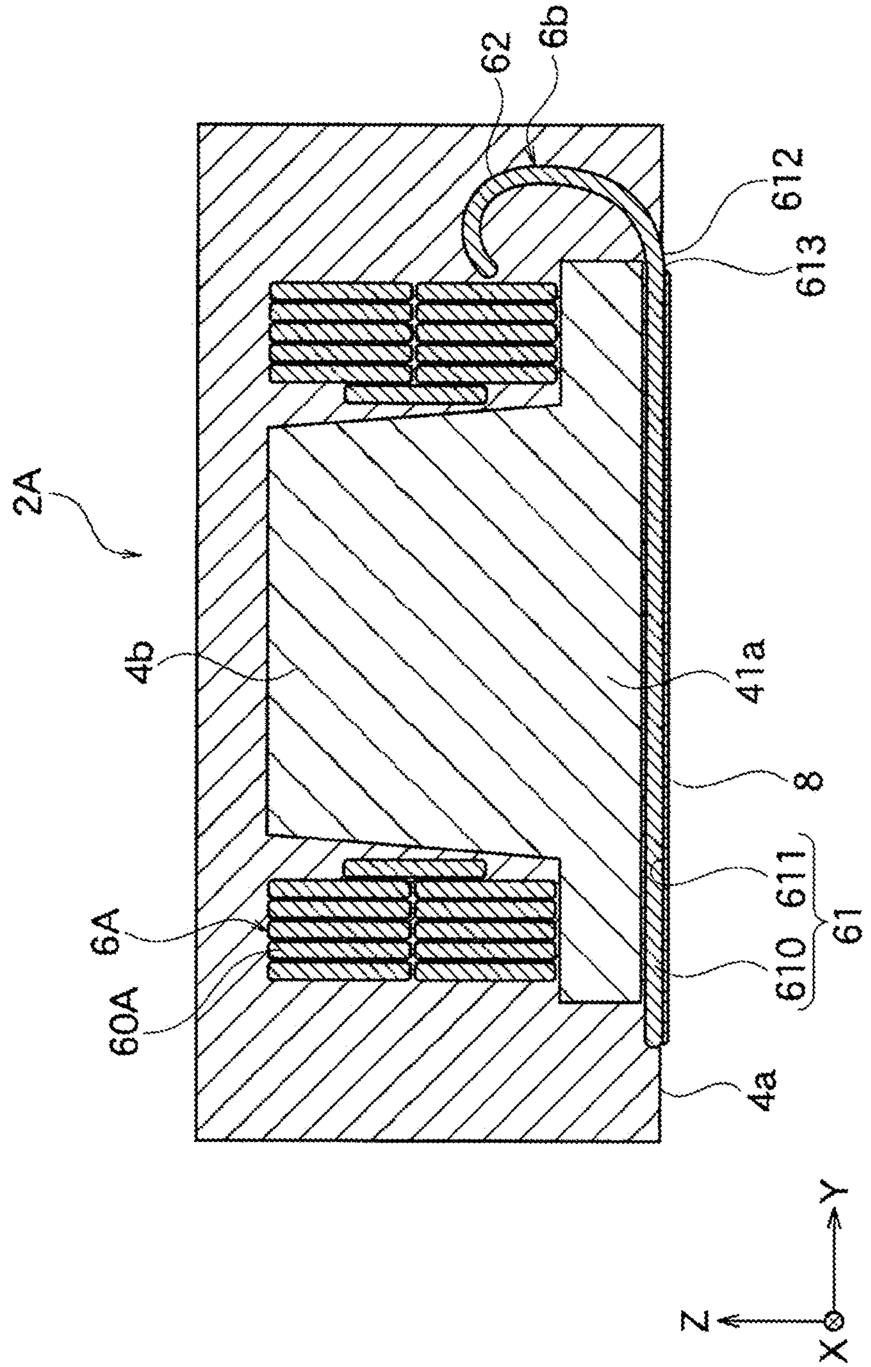
FIG. 8 is a cross-sectional view of the coil device shown in FIG. 7 along line VIII-VIII.

As shown in FIG. 8, the exposed part 611 of the terminal 61 is exposed from the bottom 4*a* of the core 4, and the metal layer 8 is formed on the surface of the exposed part 611. Therefore, the same effects as in the first embodiment can be obtained in this embodiment.

The invention is not limited to the above-described embodiments, and various modifications can be made without departing from the gist of the invention.

In the first embodiment described above, as shown in FIG. 4B, the winding 60 may be curved or warped so as to be convex upward. The degree of curvature of the winding 60 increases toward the upper end of the winding 60. Also, the degree of curvature of the winding 60 decreases toward the lower end of the winding 60.

Figure 4C:
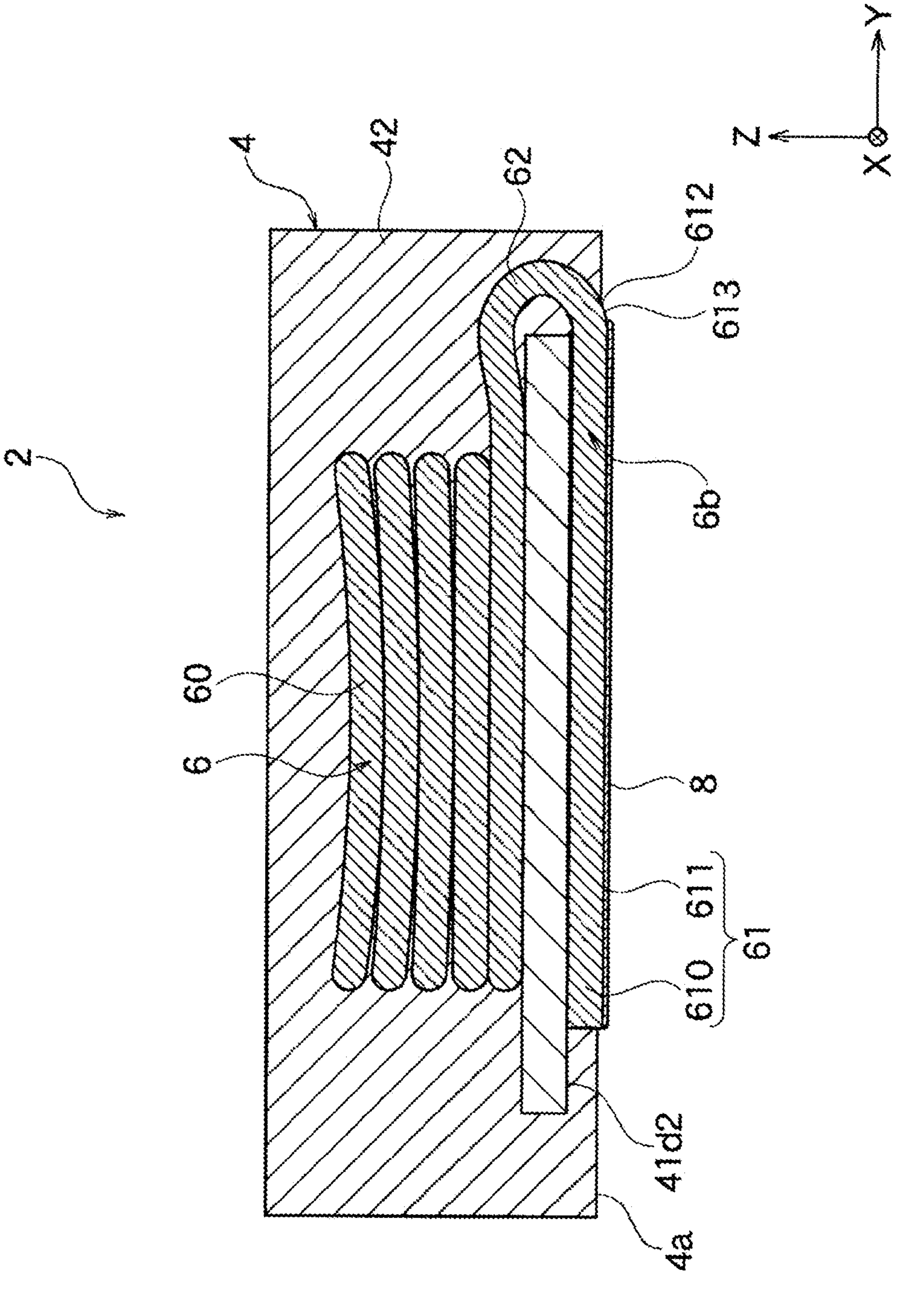
FIG. 4C is a cross-sectional view of another modified example of the coil device shown in FIG. 4A.

Further, as shown in FIG. 4C, the winding 60 may be curved or warped so as to be convex downward. The degree of curvature of the winding 60 increases toward the upper end of the winding 60. Also, the degree of curvature of the winding 60 decreases toward the lower end of the winding 60.

Figure 5B:
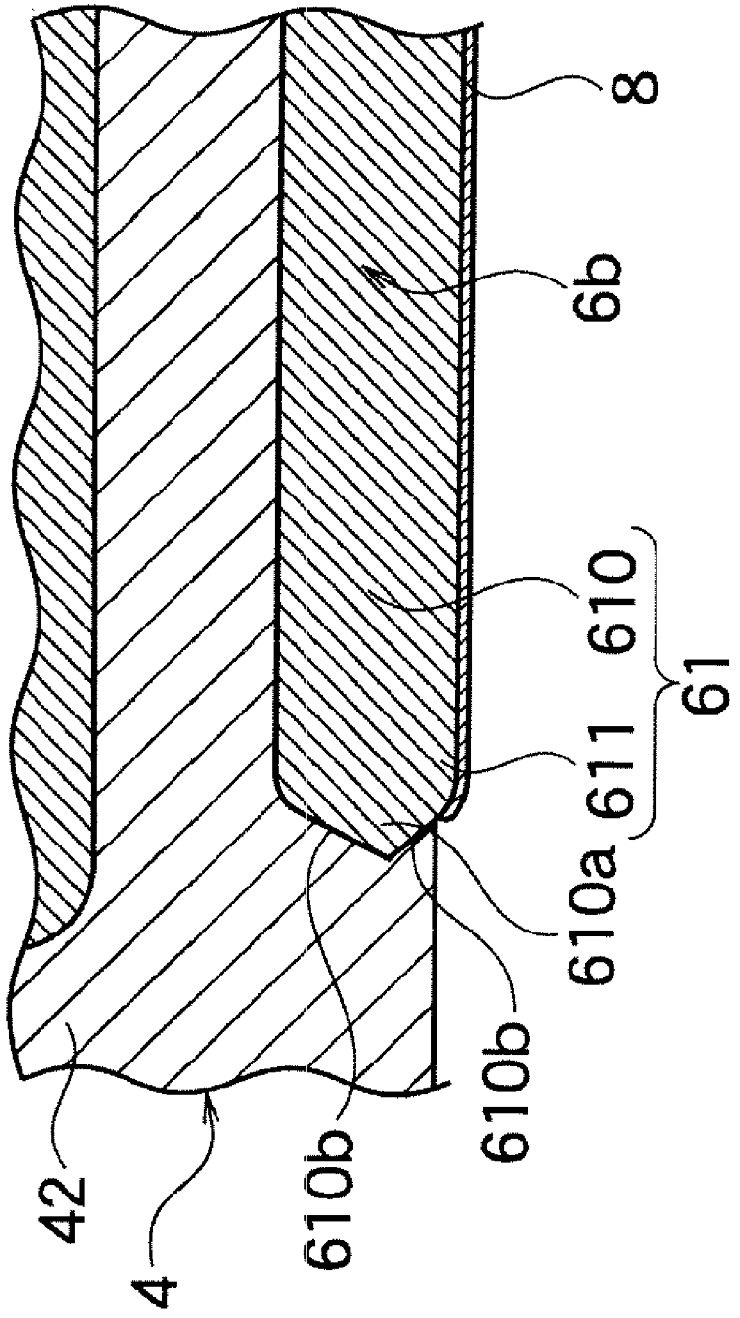
FIG. 5B is another partially enlarged cross-sectional view of the coil device shown in FIG. 4A.
Figure 5C:
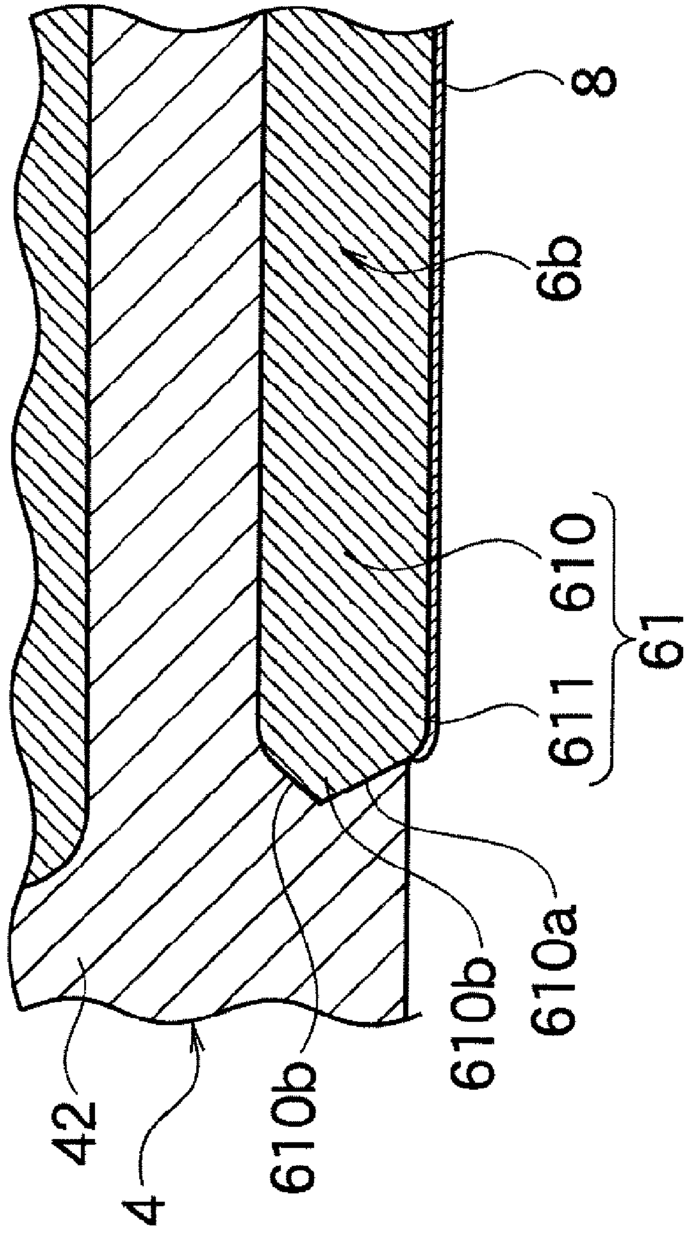
FIG. 5C is a partially enlarged cross-sectional view of a modified example of the coil device shown in FIG. 5B.

In each of the above-described embodiments, as shown in FIGS. 5B and 5C, the tip of the embedded part 610 may have a convex shape (convex 610*a*). With such a configuration, the convex 610*a* can be easily engaged with the core 4 inside the core 4, and the fixing strength between the core 4 and the embedded part 610 can be increased.

Also, a tapered surface 610*b* may be formed at the tip of the embedded part 610 (the surface of the convex 610*a*). Inside the core 4, the tapered surface 610*b* may be inclined toward the bottom 4*a* of the core 4. In the example shown in FIG. 5B, the proportion of such a tapered surface is large.

Alternatively, inside the core 4, the tapered surface 610*b* may be inclined in a direction away from the bottom 4*a* of the core 4. In the example shown in FIG. 5C, the proportion of such a tapered surface is large. In this case, the tip of the embedded part 610 is arranged at a relatively deep position (the center side of the core 4) of the core 4, effectively preventing the terminal 61 from peeling off from the bottom 4*a* of the core 4.

Figure 2B:
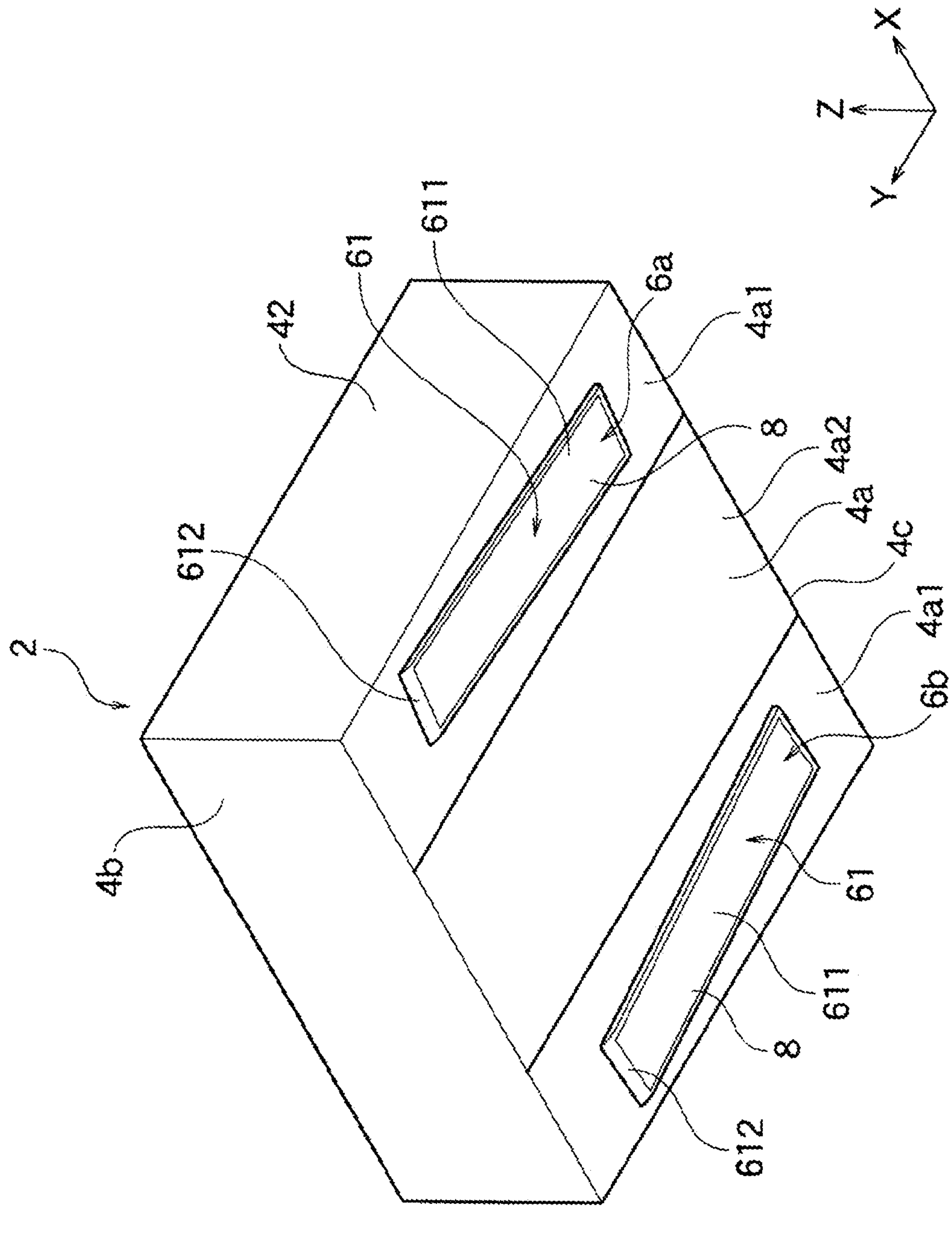
FIG. 2B is a perspective view of a modified example of the coil device shown in FIG. 2A.

In each of the above-described embodiments, as shown in FIG. 2B, the extending direction of the terminal 61 may be inclined with respect to the first direction or the second direction (the X-axis direction or the Y-axis direction) of the core 4. For example, the extending direction of the terminal 61 may be inclined with respect to the Y-axis direction so as to approach the side surface of the core 4 in the X-axis direction. Alternatively, the extending direction of the terminal 61 may be inclined with respect to the Y-axis direction so as to be away from the side surface of the core 4 in the X-axis direction.

With such a configuration, the length (the surface area) of the embedded part 610 can be increased according to the inclination angle of the terminal 61, and the fixing strength between the embedded part 610 and the core 4 can be increased. Moreover, the length (the surface area) of the exposed part 611 can be increased according to the inclination angle of the terminal 61, and the connection strength between the exposed part 611 and the mounting substrate can be improved.

In each of the above embodiments, the metal layer non-formed part 613 shown in FIG. 4A is not essential and may be omitted. That is, the metal layer 8 may also be formed on the curved surface 612 of the exposed part 611. The curved surface 612 may be omitted.

In each of the above embodiments, the distance L3 between the terminal 61 and the winding 60 and the inner diameter L4 of the bent part of the connection 62, shown in FIG. 4A, may be substantially equal.

Although the core 4 include the first layer 41 and the second layer 42 in each of the above embodiments, the core 4 may include one core. For example, the core 4 may be formed by placing the coil 6 inside a press mold, filling the inside of the press mold with a compacting material, and compressing and pressing thereof

2, 2A . . . Coil device
4 . . . Core
4*a* . . . Bottom
4*a*1 . . . Magnetic material-rich part
4*a*2 . . . Resin-rich part
41 . . . First layer
41*a* . . . Support
41*a*1 to 41*a*4 . . . First side to Fourth side
41*b* . . . Winding core
41*c*1 to 41*c*3 . . . Cutouts

41*d*1, 41*d*2 . . . Step
42 . . . Second layer
6, 6A . . . Coil
6*a*, 6*b* . . . Lead-outs
60, 60A . . . Winding
61 . . . Terminal
610 . . . Embedded part
610*a* . . . Convex
610*b* . . . Tapered surface
611 . . . Exposed part
612 . . . Curved surface
613 . . . Metal layer non-formed part
62 . . . Connection
8 . . . Metal layer
400 . . . Substrate
410 . . . First layer compact
410*a* . . . Support
410*b* . . . Winding core
410*c* . . . Cutout
410*d* . . . Step
410*e* . . . Through hole
420 . . . Second layer

What is claimed is:

1. A coil device comprising a core, a coil having a winding embedded inside the core, and a lead-out led from the winding to a bottom of the core, wherein the lead-out comprises a terminal arranged at the bottom of the core, the terminal comprises an embedded part embedded inside the core and an exposed part exposed from the core, the winding and the terminal are composed of a continuous plate-shaped wire, a protruding thickness of the exposed part, which protrudes and is exposed from a surface of the core, is ⅕ or more and less than ¾ of a thickness of the plate-shaped wire, and a metal layer for mounting is formed on a surface of the exposed part.

2. The coil device according to claim 1, wherein the metal layer is comprised by a metal film.

3. The coil device according to claim 1, wherein the exposed part comprises a first end forming an end of the lead-out, and a second end located on the opposite side of the first end along an extending direction of the exposed part, and a curved surface that curves toward the bottom of the core is formed on the surface of the exposed part at the second end.

4. The coil device according to claim 3, wherein the metal layer does not exist at a position spaced apart from a bottom surface of the metal layer toward the bottom of the core on the curved surface.

5. The coil device according to claim 1, wherein the thickness of the embedded part is ½ or more and less than ⅘ of the thickness of the plate-shaped wire.

6. The coil device according to claim 1, wherein the core comprises a resin and a magnetic material, a resin-rich part having a resin content and a magnetic material-rich part having a magnetic material content are formed at the bottom of the core, and the exposed part is exposed from the magnetic material-rich part.

7. The coil device according to claim 6, wherein a surface roughness of the bottom of the core in the magnetic material-rich part is larger than the surface roughness of the bottom of the core in the resin-rich part.

8. The coil device according to claim 1, wherein the plate-shaped wire comprises an insulation coated flat wire.

9. The coil device according to claim 1, wherein the terminal extends linearly along the bottom of the core from one end to the other end in an extending direction.

10. The coil device according to claim 1, wherein an extending direction of the terminal is inclined with respect to a first direction, where sides of the core face each other, or a second direction perpendicular to the first direction in a plane parallel to the bottom of the core.

11. The coil device according to claim 1, wherein a first distance between the exposed part and one side of the core and a second distance between the exposed part and the other side of the core are different, with respect to a direction where the one side of the core and the other side of the core face each other.

12. The coil device according to claim 1, wherein the lead-out comprises a connection embedded inside the core and connects the winding and the terminal, the connection is bent from the winding to the terminal, a distance between the terminal and the winding with respect to a winding axial direction of the coil is smaller than an inner diameter of a bent part of the connection.

13. The coil device according to claim 1, wherein a tip of the embedded part has a convex shape.

14. The coil device according to claim 13, wherein a tip of the embedded part has a tapered surface, and the tapered surface is inclined within the core in a direction away from the bottom of the core.

* * * * *